(12) United States Patent
Ide et al.

(10) Patent No.: US 11,520,158 B2
(45) Date of Patent: *Dec. 6, 2022

(54) DISPLAY DEVICE

(71) Applicant: SEIKO EPSON CORPORATION, Tokyo (JP)

(72) Inventors: Mitsutaka Ide, Shiojiri (JP); Masatoshi Yonekubo, Hara-mura (JP)

(73) Assignee: SEIKO EPSON CORPORATION, Tokyo (JP)

( * ) Notice: Subject to any disclaimer, the term of this patent is extended or adjusted under 35 U.S.C. 154(b) by 50 days.

This patent is subject to a terminal disclaimer.

(21) Appl. No.: 17/160,788

(22) Filed: Jan. 28, 2021

(65) Prior Publication Data

US 2021/0149209 A1    May 20, 2021

Related U.S. Application Data

(63) Continuation of application No. 16/257,109, filed on Jan. 25, 2019, now Pat. No. 10,935,807.

(30) Foreign Application Priority Data

Jan. 26, 2018  (JP) .............................. JP2018-011313
Oct. 30, 2018  (JP) .............................. JP2018-203691

(51) Int. Cl.
  *G02B 27/42*   (2006.01)
  *G02B 27/01*   (2006.01)
  (Continued)

(52) U.S. Cl.
  CPC ....... *G02B 27/4227* (2013.01); *G02B 5/1814* (2013.01); *G02B 27/0081* (2013.01);
  (Continued)

(58) Field of Classification Search
  CPC .............. G02B 5/1814; G02B 27/4227; G02B 27/0081; G02B 27/017; G02B 27/0172;
  (Continued)

(56) References Cited

U.S. PATENT DOCUMENTS 5,646,783 A    7/1997 Banbury
6,788,442 B1 *  9/2004 Potin ................... G02B 27/0172
                                                    359/13

(Continued)

FOREIGN PATENT DOCUMENTS

JP    H08-184779 A    7/1996
JP    2002-139695 A   5/2002

(Continued)

OTHER PUBLICATIONS

Jul. 1, 2019 Search Report issued in European Patent Application No. 19153470.0.

(Continued)

*Primary Examiner* — Alexander Eisen
*Assistant Examiner* — Cory A Almeida
(74) *Attorney, Agent, or Firm* — Oliff PLC

(57) ABSTRACT

In an optical system, a first optical section having positive power, a second optical section provided with a first diffractive element and having positive power, a third optical section having positive power, and a fourth optical section provided with a second diffractive element and having positive power are disposed along a light path of image light emitted from an image light generation device. A first intermediate image of the image light is formed between the first optical section and the third optical section, a pupil is formed in the vicinity of the third optical section, a second intermediate image of the image light is formed between the third optical section and the fourth optical section, and the fourth optical section collimates the image light to form an (Continued)

exit pupil. The first diffractive element and the second diffractive element are in a conjugate relation or a roughly conjugate relation.

16 Claims, 18 Drawing Sheets

(51) Int. Cl.
*G02B 5/18* (2006.01)
*G02B 27/00* (2006.01)

(52) U.S. Cl.
CPC .. *G02B 27/0172* (2013.01); *G02B 2027/0105* (2013.01); *G02B 2027/0174* (2013.01); *G02B 2027/0178* (2013.01)

(58) Field of Classification Search
CPC .... G02B 2027/0105; G02B 2027/0174; G02B 2027/0178
See application file for complete search history.

(56) References Cited

U.S. PATENT DOCUMENTS

| | | |
|---|---|---|
| 8,089,568 B1 | 1/2012 | Brown et al. |
| 9,454,011 B2 | 9/2016 | Hiraide |
| 2002/0039232 A1 | 4/2002 | Takeyama |
| 2004/0184152 A1 | 9/2004 | Matsunaga et al. |
| 2004/0257663 A1 | 12/2004 | Edelmann |
| 2006/0228073 A1 | 10/2006 | Mukawa et al. |
| 2009/0141324 A1 | 6/2009 | Mukawa |
| 2013/0222384 A1 | 8/2013 | Futterer |
| 2016/0161755 A1 | 6/2016 | Yonekubo et al. |
| 2016/0178909 A1 | 6/2016 | Komatsu et al. |
| 2017/0242252 A1 | 8/2017 | Ide et al. |
| 2017/0261751 A1 | 9/2017 | Noguchi et al. |
| 2018/0031843 A1 | 2/2018 | Pan et al. |
| 2018/0151194 A1 | 5/2018 | Noguchi |
| 2020/0142195 A1 | 5/2020 | Ide |

FOREIGN PATENT DOCUMENTS

| | | |
|---|---|---|
| JP | 2004-318140 A | 11/2004 |
| JP | 2009-133998 A | 6/2009 |
| JP | 2016-71309 A | 5/2016 |
| JP | 2016-109923 A | 6/2016 |
| JP | 2017-167181 A | 9/2017 |
| JP | 2018-087949 A | 6/2018 |

OTHER PUBLICATIONS

Jun. 26, 2020 Office Action issued in U.S. Appl. No. 16/257,109.
Oct. 28, 2020 Notice of Allowance issued in U.S. Appl. No. 16/257,109.

\* cited by examiner

DISPLAY DEVICE

CROSS REFERENCE TO RELATED APPLICATION

This application is a continuation of U.S. application Ser. No. 16/257,109, filed Jan. 25, 2019, the contents of which are incorporated herein by reference.

BACKGROUND

1. Technical Field

The present invention relates to a display device for displaying an image using a diffractive element.

2. Related Art

As a display device using a diffractive element such as a holographic element, there is proposed a device for deflecting image light having been emitted from an image light generation device toward the eyes of an observer using the diffractive element. In the diffractive element, interference stripes are optimized so that an optimum diffractive angle and diffractive efficiency can be obtained at a specific wavelength. However, since the image light has predetermined spectrum width centered on the specific wavelength, the light at a peripheral wavelength shifted from the specific wavelength becomes a factor for degrading the resolution of the image. Therefore, there is proposed a display device in which the image light having been emitted from the image light generation device is emitted toward a second diffractive element disposed on the front side using a first diffractive element of a reflective type, and then the image light having been emitted from the first diffractive element is deflected toward the eyes of the observer using the second diffractive element. According to such a configuration, it is possible to perform wavelength compensation using the first diffractive element, and it is possible to prevent the degradation of the resolution of the image due to the light at the peripheral wavelength shifted from the specific wavelength (see JP-A-2017-167181 (Document 1)). Further, there is proposed a display device provided with two diffractive elements designed so as to compensate an application error with each other (see JP-A-2004-318140 (Document 2)). Further, there is proposed a technology for preventing occurrence of an aberration and a color shift using two diffractive elements in an eyepiece optical system (see JP-A-08-184779 (Document 3)).

However, in the technologies disclosed in Documents 1, 2 and 3 described above, since there is a possibility that the wavelength compensation cannot sufficiently be achieved by the two diffractive elements, a further improvement has been desired.

SUMMARY

An advantage of some aspects of the invention is to provide a display device capable of appropriately performing the wavelength compensation using the two diffractive elements.

A display device according to a first aspect of the invention includes a first optical section having positive power, a second optical section provided with a first diffractive element and having positive power, a third optical section having positive power, and a fourth optical section provided with a second diffractive element and having positive power, the first optical section, the second optical section, the third optical section and the fourth optical section are disposed along a light path of image light emitted from an image light generation device, a first intermediate image of the image light is formed between the first optical section and the third optical section, a pupil is formed between the second optical section and the fourth optical section, a second intermediate image of the image light is formed between the third optical section and the fourth optical section, and an exit pupil is formed in the light path on an opposite side of the fourth optical section to the third optical section.

According to the display device according to the first aspect, the first intermediate image of the image light is formed between the first optical section and the third optical section, the second intermediate image is formed between the third optical section and the fourth optical section, and the pupil is formed in the vicinity of the third optical section. Therefore, it is possible to image the light beam emitted from one point of the image light generation device on the retina as one point, and at the same time, make the entrance pupil of the optical system and the pupil of the eyeball have a conjugate relation, and further, make the two diffractive elements (the first diffractive element and the second diffractive element) have a conjugate relation or a roughly conjugate relation. Therefore, since the positions of the first diffractive element and the second diffractive element which the same light beam enters correspond to each other, it is possible to appropriately perform the wavelength compensation using the two diffractive elements.

The display device according to the first aspect may be configured such that the first intermediate image is formed between the first optical section and the second optical section. According to such an aspect, it is possible to perform more sufficient wavelength compensation than in the case of forming the first intermediate image between the second optical section and the third optical section.

The display device according to the first aspect may be configured such that the third optical section arbitrarily controls the image light emitted from the second optical section into diverging light, converging light or parallel light, and then make the image light enter the fourth optical section.

The display device according to the first aspect may be configured such that the third optical section makes light deflected by the first diffractive element to be shifted from light with a specific wavelength enter a predetermined range of the second diffractive element with respect to light corresponding to one point of an image generated by the image light generation device. In the aspect of the invention, the "light corresponding to one point of the image generated by the image light generation device" corresponds to the light emitted from one point of the display surface of the image light generation device shaped like a panel in the case in which the image light generation device is shaped like a panel. In contrast, in the case in which the image light generation device performs two-dimensional scan with the laser beam using the micromirror device to thereby generate the image, the "light corresponding to one point of the image generated by the image light generation device" corresponds to the light emitted from the micromirror device in one direction.

The display device according to the first aspect may be configured such that the second optical section makes the image light emitted from the first optical section enter the third optical section as converging light.

The display device according to the first aspect may be configured such that a plane of incidence of the second diffractive element is a concavely curved surface recessed in a central part from a peripheral part, and the second diffractive element collimates the image light emitted from the third optical section.

The display device according to the first aspect may be configured such that an absolute value of magnifying power of projection on the second diffractive element due to the third optical section of the first diffractive element is in a range from 0.5 times to 10 times. In this case, the absolute value of the magnifying power is preferably in a range from the same size to 5 times.

The display device according to the first aspect may be configured such that an optical distance between the first diffractive element and the third optical section is shorter than an optical distance between the third optical section and the second diffractive element.

The display device according to the first aspect may be configured such that the first diffractive element and the second diffractive element are in a conjugate relation. Further, it is possible to adopt a configuration in which light emitted from a first position in the first diffractive element enters a range of ±0.8 mm with respect to a second position corresponding to the first position in the second diffractive element.

A display device according to a second aspect of the invention includes a first optical section having positive power and including a plurality of lenses, a second optical section provided with a first diffractive element and having positive power, a third optical section having positive power, and a fourth optical section provided with a second diffractive element and having positive power, the first optical section, the second optical section, the third optical section and the fourth optical section are disposed along a light path of image light emitted from an image light generation device, a first intermediate image of the image light is formed in the light path between a first lens located closest to the image light generation device out of the plurality of lenses in the first optical section and the third optical section, a pupil is formed between the second optical section and the fourth optical section, a second intermediate image of the image light is formed between the third optical section and the fourth optical section, and an exit pupil is formed on an opposite side of the fourth optical section to the third optical section.

According to the display device according to the second aspect, the first intermediate image of the image light is formed between the first lens and the third optical section, the second intermediate image is formed between the third optical section and the fourth optical section, and the pupil is formed in the vicinity of the third optical section. Therefore, it is possible to image the light beam emitted from one point of the image light generation device on the retina as one point, and at the same time, make the entrance pupil of the optical system and the pupil of the eyeball have a conjugate relation, and further, make the two diffractive elements (the first diffractive element and the second diffractive element) have a conjugate relation or a roughly conjugate relation. Therefore, since the positions of the first diffractive element and the second diffractive element which the same light beam enters correspond to each other, it is possible to appropriately perform the wavelength compensation using the two diffractive elements.

The display device according to the second aspect may be configured such that the first intermediate image is formed in the first optical section.

BRIEF DESCRIPTION OF THE DRAWINGS

The invention will be described with reference to the accompanying drawings, wherein like numbers reference like elements.

DESCRIPTION OF EXEMPLARY EMBODIMENTS

First Embodiment

An embodiment of the invention will hereinafter be described with reference to the accompanying drawings. It should be noted that in each of the drawings described below, the scale sizes and angles of the layers and the members are made different from the actual ones in order to make the layers and the members have recognizable dimensions.

Figure 1:
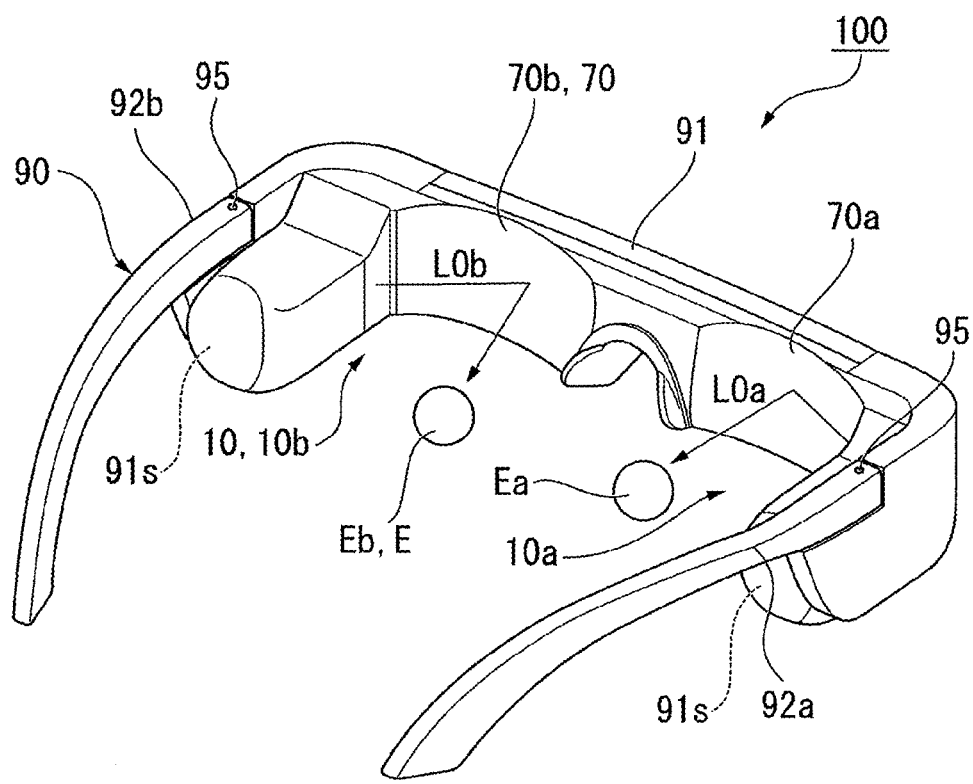
FIG. 1 is an appearance diagram showing an aspect of an appearance of a display device according to a first embodiment of the invention.
Figure 2:
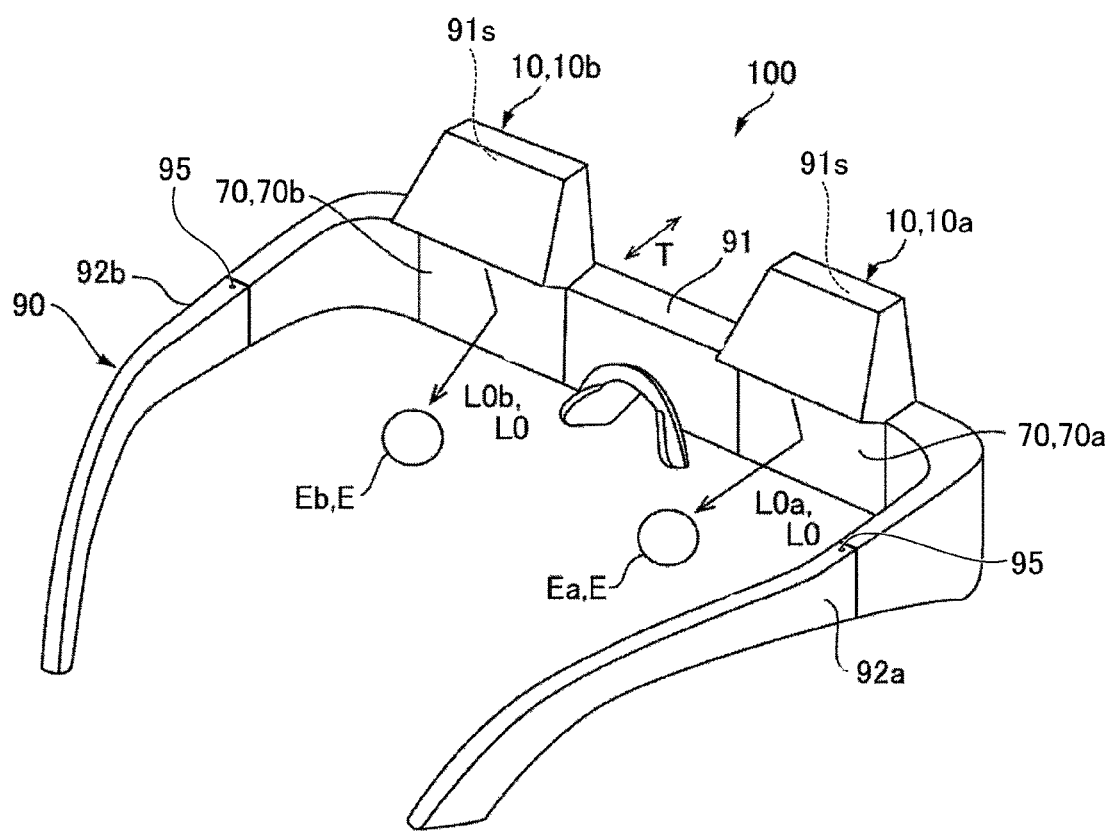
FIG. 2 is an appearance diagram showing an aspect of another appearance of the display device.
Figure 3:
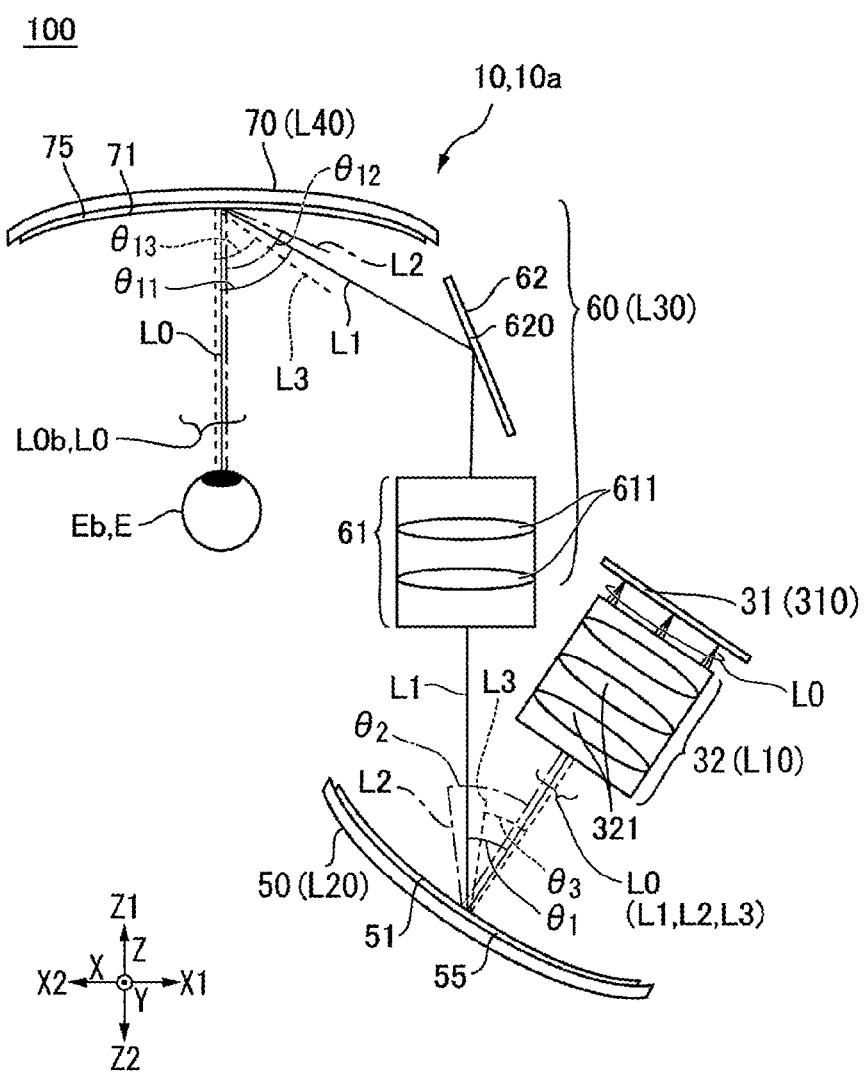
FIG. 3 is an explanatory diagram showing an aspect of an optical system of the display device.

FIG. 1 is an appearance diagram showing an aspect of an appearance of a display device 100 according to the present embodiment. FIG. 2 is an appearance diagram showing an aspect of another appearance of the display device 100. FIG. 3 is an explanatory diagram showing an aspect of an optical system 10 of the display device 100 shown in FIG. 1. It should be noted that in FIG. 1 through FIG. 3, the anteroposterior direction with respect to an observer wearing the display device is defined as a direction along a Z axis, the front of the observer wearing the display device as one side in the anteroposterior direction is defined as a front side Z1, and the rear of the observer wearing the display device as the other side in the anteroposterior direction is defined as a rear side Z2. Further, the horizontal direction with respect to the observer wearing the display device is defined as a direction along an X axis, the right side of the observer wearing the display device as one side in the horizontal direction is defined as a right side X1, and the left side of the observer wearing the display device as the other side in the horizontal direction is defined as a left side X2. Further, the vertical direction with respect to the observer wearing the display device is defined as a direction along a Y axis, the upper side of the observer wearing the display device as one side in the vertical direction is defined as an upper side Y1, and the lower side of the observer wearing the display device as the other side in the vertical direction is defined as a lower side Y2.

The device 100 shown in FIG. 1 is a head-mounted display device, and has a right-eye optical system 10a for making image light L0a enter the right eye Ea, and a left-eye optical system 10b for making image light L0b enter the left eye Eb. The display device 100 is formed to have a shape of, for example, a pair of eyeglasses. Specifically, the display device 100 is further provided with a housing 90 for holding the right-eye optical system 10a and the left-eye optical system 10b. The display device 100 is mounted on the head of the observer with the housing 90.

As the housing 90, the display device 100 is provided with a frame 91, a temple 92a disposed on the right side of the frame 91 to be caught by the right ear of the observer, and a temple 92b disposed on the left side of the frame 91 to be caught by the left ear of the observer. The frame 91 has housing spaces 91s in both side sections, and a variety of parts such as an image light projection device constituting optical systems 10 described later are housed in the housing spaces 91s. The temples 92a, 92b are foldably connected to the frame 91 with hinges 95.

The right-eye optical system 10a and the left-eye optical system 10b are the same in basic configuration. Therefore, in the following description, the right-eye optical system 10a and the left-eye optical system 10b are each described as the optical system 10 without being discriminated.

Further, although the image light L0 is made to proceed in the horizontal direction along the X axis in the display device 100 shown in FIG. 1, there is a case in which the image light L0 is made to proceed from the upper side Y1 toward the lower side Y2 to be emitted to the eyes E of the observer as shown in FIG. 2, or the case in which there is adopted a configuration of disposing the optical systems 10 throughout the area from the top of the head to the front of the eyes E.

The basic configuration of the optical systems 10 of the display device 100 will be described with reference to FIG. 3. FIG. 3 is an explanatory diagram showing an aspect of the optical system 10 of the display device 100 shown in FIG. 1. It should be noted that in FIG. 3, in addition to the light L1 (solid lines) of a specific wavelength of the image light L0, there are also illustrated the light L2 (dashed-dotted lines) on the long-wavelength side and the light L3 (dotted lines) on the short-wavelength side with respect to the specific wavelength.

As shown in FIG. 3, in the optical system 10, a first optical section L10 having positive power, a second optical section L20 having positive power, a third optical section L30 having positive power, and a fourth optical section L40 having positive power are disposed along the proceeding direction of the image light L0 emitted from an image light generation device 31.

In the present embodiment, the first optical section L10 having the positive power is constituted by a projection optical system 32. The second optical section L20 having the positive power is constituted by a first diffractive element 50 of a reflective type. The third optical section L30 having the positive power is constituted by a light guide system 60. The fourth optical section L40 having the positive power is constituted by a second diffractive element 70 of the reflective type. In the present embodiment, the first diffractive element 50 and the second diffractive element 70 are each the reflective type diffractive element.

In such an optical system 10, focusing attention to the proceeding direction of the image light L0, the image light generation device 31 emits the image light L0 toward the projection optical system 32, the projection optical system 32 emits the image light L0 having entered the projection optical system 32 toward the first diffractive element 50, and the first diffractive element 50 emits the image light L0 having entered the first diffractive element 50 toward the light guide system 60. The light guide system 60 emits the image light L0 having entered the light guide system 60 to the second diffractive element 70, and then the second diffractive element emits the image light L0 having entered the second diffractive element 70 toward the eye E of the observer.

In the present embodiment, the image light generation device 31 generates the image light L0.

As the image light generation device 31, it is possible to adopt a configuration provided with a display panel 310 such as an organic electroluminescence display element. According to such a configuration, it is possible to provide the display device 100 small in size and capable of displaying an image high in image quality. Further, as the image light generation device 31, it is possible to adopt a configuration provided with an illumination light source (not shown) and the display panel 310 such as a liquid crystal display element for modulating illumination light emitted from the illumination light source. According to such a configuration, since it is possible to select the illumination light source, there is an advantage that the degree of freedom of the wavelength characteristics of the image light L0 expands. Here, as the image light generation device 31, it is possible to adopt a configuration having the single display panel 310 capable of color display. Further, as the image light generation device 31, it is also possible to adopt a configuration having the plurality of display panels 310 corresponding respectively to the colors, and a combining optical system for combining the image light of the respective colors emitted from the plurality of display panels 310 with each other. Further, as the image light generation device 31, it is also possible to adopt a configuration of modulating a laser beam with a micromirror device.

The projection optical system 32 is an optical system for projecting the image light L0 generated by the image light generation device 31, and is constituted by a plurality of lenses 321. In FIG. 3, there is cited the case of using the three lenses 321 in the projection optical system 32 as an example, but the number of the lenses 321 is not limited to this example, and it is also possible for the projection optical system 32 to be provided with four or more lenses 321. Further, it is also possible for the lenses 321 to be bonded to each other to constitute the projection optical system 32. Further, it is also possible for the lens 321 to be formed of a lens with a free-form surface.

The light guide system 60 has a lens system 61 which the image light L0 having been emitted from the first diffractive element 50 enters, and a mirror 62 for emitting the image light L0 having been emitted from the lens system 61 toward a direction tilted obliquely. The lens system 61 is constituted by a plurality of lenses 611 disposed in the anteroposterior direction along the Z axis. The mirror 62 has a reflecting surface 620 tilted obliquely toward the anteroposterior direction. In the present embodiment, the mirror 62 is a total reflection mirror. It should be noted that it is also possible to use a half mirror as the mirror 62, and in this case, it is possible to widen the range in which the outside light can visually be recognized.

Then, a configuration of the first diffractive element 50 and the second diffractive element 70 will be described.

In the present embodiment, the first diffractive element 50 and the second diffractive element 70 are the same in basic configuration. Hereinafter, the description will be presented citing the configuration of the second diffractive element 70 as an example.

Figure 4A:
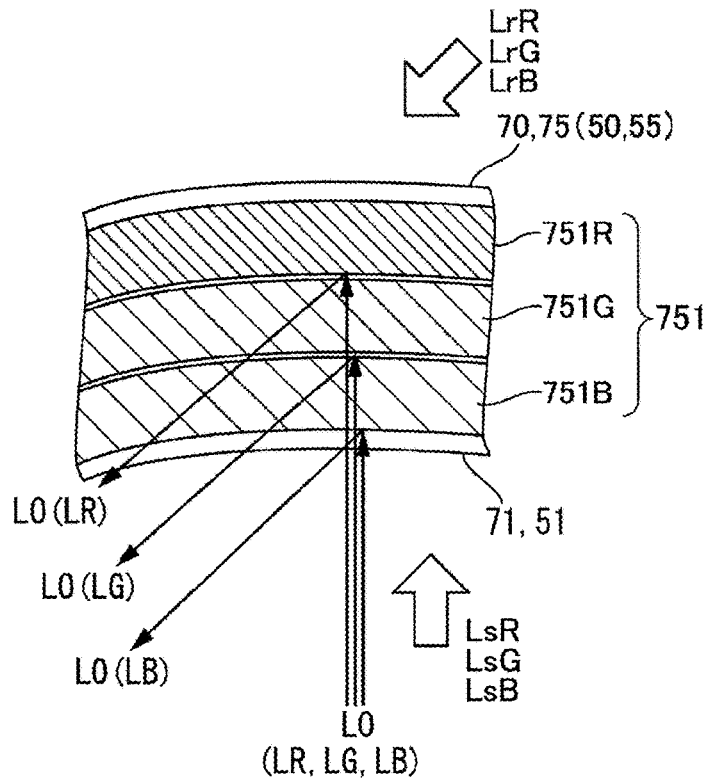
FIG. 4A is an explanatory diagram of interference stripes of a diffractive element.

FIG. 4A is an explanatory diagram of interference stripes 751 of the second diffractive element 70 shown in FIG. 3. As shown in FIG. 4A, the second diffractive element 70 is provided with a reflective volume holographic element 75, and the reflective volume holographic element 75 is a partial reflective diffractive optical element. Therefore, the second diffractive element 70 constitutes a combiner having a partial transmissive reflective property. Therefore, since the outside light also enters the eye E via the second diffractive element 70, it is possible for the observer to visually recognize the image in which the image light L0 formed in the image light generation device 31 and the outside light (the background) are superimposed on each other.

The second diffractive element 70 is opposed to the eye E of the observer, and a plane of incidence 71 of the second diffractive element 70 which the image light L0 enters has a concavely curved surface recessed toward a direction of getting away from the eye E. In other words, the plane of incidence 71 has a shape curved so that the central part is recessed with respect to the peripheral part in the incident direction of the image light L0. Therefore, it is possible to efficiently converge the image light L0 toward the eye E of the observer.

The second diffractive element 70 has the interference stripes 751 having a pitch corresponding to the specific wavelength. The interference stripes 751 are recorded on a holographic photosensitive layer as a difference in refractive index, and the interference stripes 751 are tilted toward one direction with respect to the plane of incidence 71 of the second diffractive element 70 so as to correspond to a specific incident angle. Therefore, the second diffractive element 70 diffracts to deflect the image light L0 toward a predetermined direction. The specific wavelength and the specific incident angle correspond to the wavelength and the incident angle of the image light L0. The interference stripes 751 having such a configuration can be formed by performing interference exposure on the holographic photosensitive layer using reference light Lr and object light Ls.

In the present embodiment, the image light L0 is used for the color display. Therefore, the second diffractive element 70 has the interference stripes 751R, 751G and 751B each formed at the pitch corresponding to the specific wavelength. For example, the interference stripes 751R are formed at a pitch corresponding to red image light LR having a wavelength of, for example, 615 nm in a wavelength range of 580 nm through 700 nm. The interference stripes 751G are formed at a pitch corresponding to green image light LG having a wavelength of, for example, 535 nm in a wavelength range of 500 nm through 580 nm. The interference stripes 751B are formed at a pitch corresponding to blue image light LB having a wavelength of, for example, 460 nm in a wavelength range of 400 nm through 500 nm. Such a configuration can be formed by performing the interference exposure on the holographic photosensitive layer using the reference light LrR, LrG and LrB and the object light LsR, LsG and LsB having respective wavelengths in the state in which the holographic photosensitive layers having sensitivities corresponding to the respective wavelengths are formed.

Figure 4B:
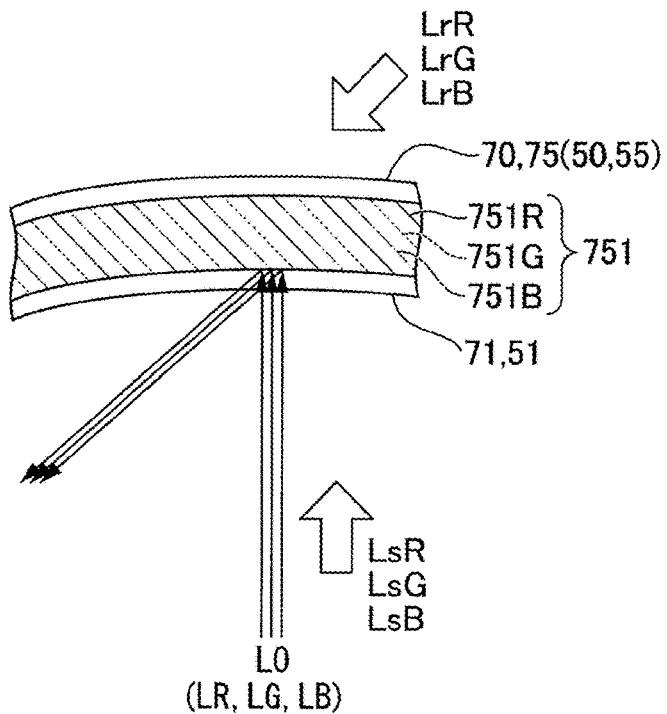
FIG. 4B is an explanatory diagram of another aspect of the interference stripes of the diffractive element.

It should be noted that it is also possible to disperse the photosensitive materials having sensitivities to the respective wavelengths in the holographic photosensitive layer, and then form the interference stripes 751 having the interference stripes 751R, 751G and 751B superimposed in one layer as shown in FIG. 4B by performing the interference exposure on the holographic photosensitive layer using the reference light LrR, LrG and LrB and the object light LsR, LsG and LsB having the respective wavelengths. Further, it is also possible to use light of a spherical wave as the reference light LrR, LrG and LrB and the object light LsR, LsG and LsB.

The first diffractive element 50 the same in basic configuration as the second diffractive element 70 is provided with a reflective volume holographic element 55. The first diffractive element 50 has a concavely curved surface which is a recessed surface as a plane of incidence 51 which the image light L0 enters. In other words, the plane of incidence 51 has a shape curved so that the central part is recessed with respect to the peripheral part in the incident direction of the image light L0. Therefore, it is possible to efficiently deflect the image light L0 toward the light guide system 60.

Figure 5:
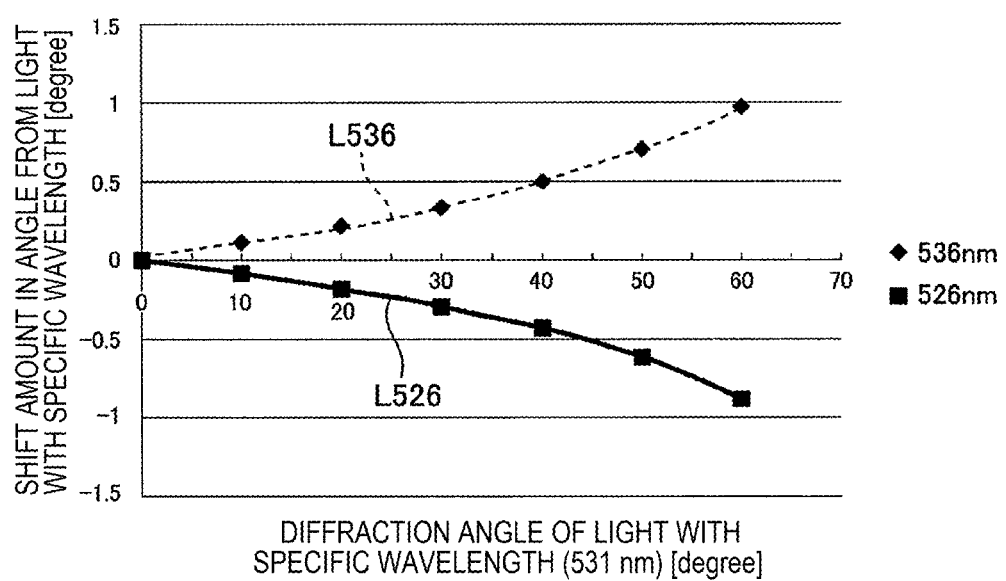
FIG. 5 is an explanatory diagram showing diffractive characteristics of a first diffractive element and a second diffractive element.

FIG. 5 is an explanatory diagram showing the diffractive characteristics of the first diffractive element 50 and the second diffractive element 70 shown in FIG. 3. FIG. 5 shows differences in diffraction angle between the specific wavelength and peripheral wavelengths in the case in which the light beam enters a point on the volume hologram. FIG. 5 shows a shift in diffraction angle of the light with the peripheral wavelength having the wavelength of 526 nm with the solid line L526, and shows a shift in diffraction angle of the light with the peripheral wavelength having the wavelength of 536 nm with the dotted line L536 assuming the specific wavelength as 531 nm. As shown in FIG. 5, even in the case in which the light beam enters the same interference stripes recorded on the hologram, the longer the wavelength of the light beam is, the more largely the light beam is diffracted, and the shorter the wavelength of the light beam is, the more difficult for the light beam to be diffracted. Therefore, in the case of using the two diffractive elements, namely the first diffractive element 50 and the second diffractive element 70, as in the present embodiment, the wavelength compensation cannot appropriately achieved unless the light beam is made to enter the diffractive elements taking the light beam angles in the long wavelength light and the short wavelength light into consideration. In other words, it becomes unachievable to cancel the color aberration generated in the second diffractive element 70. Further, since the diffraction angle differs by the number of interference stripes, it is necessary to take the interference stripes into consideration.

In the optical system 10 shown in FIG. 3, as described in Document 1, since the incident direction to the second diffractive element 70 and so on have been optimized in accordance with whether the sum of the number of times of the formation of the intermediate image between the first diffractive element 50 and the second diffractive element 70 and the number of times of the reflection by the mirror 62 is odd or even, it is possible to achieve the wavelength compensation, namely cancel the color aberration.

Specifically, as shown in FIG. 3, the image light L0 having entered the first diffractive element 50 is diffracted by the first diffractive element 50 to thereby be deflected. On this occasion, the diffraction angle $\theta 2$ of the light L2 on the long wavelength side with respect to the specific wavelength becomes larger than the diffraction angle $\theta 1$ of the light L1 with the specific wavelength. Further, the diffraction angle $\theta 3$ of the light L3 on the short wavelength side with respect to the specific wavelength becomes smaller than the diffraction angle $\theta 1$ of the light L1 with the specific wavelength. Therefore, it results in that the image light L0 having been emitted from the first diffractive element 50 is deflected for each wavelength to be dispersed.

The image light L0 having been emitted from the first diffractive element 50 enters the second diffractive element 70 via the light guide system 60, and is diffracted by the second diffractive element 70 to thereby be deflected. On this occasion, the formation of the intermediate image is performed once and the reflection by the mirror 62 is performed once in the light path from the first diffractive element 50 to the second diffractive element 70. Therefore, defining the angle between the image light L0 and the normal line of the plane of incidence of the second diffractive element 70 as the incident angle, the light L2 on the long wavelength side with respect to the specific wavelength has the incident angle $\theta 12$ larger than the incident angle $\theta 11$ in the light L1 with the specific wavelength, and the light L3 on the short wavelength side with respect to the specific wavelength has the incident angle $\theta 13$ smaller than the incident angle $\theta 11$ in the light L1 with the specific wavelength. Further, as described above, the diffraction angle $\theta 2$ of the light L2 on the long wavelength side with respect to the specific wavelength becomes larger than the diffraction angle $\theta 1$ of the light L1 with the specific wavelength, and the diffraction angle $\theta 3$ of the light L3 on the short wavelength side with respect to the specific wavelength becomes smaller than the diffraction angle $\theta 1$ of the light L1 with the specific wavelength.

Therefore, although the light L2 on the long wavelength side with respect to the specific wavelength enters the first diffractive element 50 with a larger incident angle than that of the light L1 with the specific wavelength, since the diffraction angle of the light L2 on the long wavelength side with respect to the specific wavelength is larger than the diffraction angle of the light L1 with the specific wavelength, as a result, the light L2 on the long wavelength side with respect to the specific wavelength and the light L1 with the specific wavelength become roughly parallel to each other when being emitted from the second diffractive element 70. In contrast, although the light L3 on the short wavelength side with respect to the specific wavelength enters the first diffractive element 50 with a smaller incident angle than that of the light L1 with the specific wavelength, since the diffraction angle of the light L3 on the short wavelength side with respect to the specific wavelength is smaller than the diffraction angle of the light L1 with the specific wavelength, as a result, the light L3 on the short wavelength side with respect to the specific wavelength and the light L1 with the specific wavelength become roughly parallel to each other when being emitted from the second diffractive element 70. In such a manner as described above, since the image light L0 having been emitted from the second diffractive element 70 enters the eye E of the observer as the roughly parallel light as shown in FIG. 3, the shift in image location on a retina E0 between the wavelengths is suppressed. Therefore, it is possible to cancel the color aberration generated in the second diffractive element 70.

Then, a conjugate relation between the first diffractive element 50 and the second diffractive element 70 will be described.

Figure 6A:
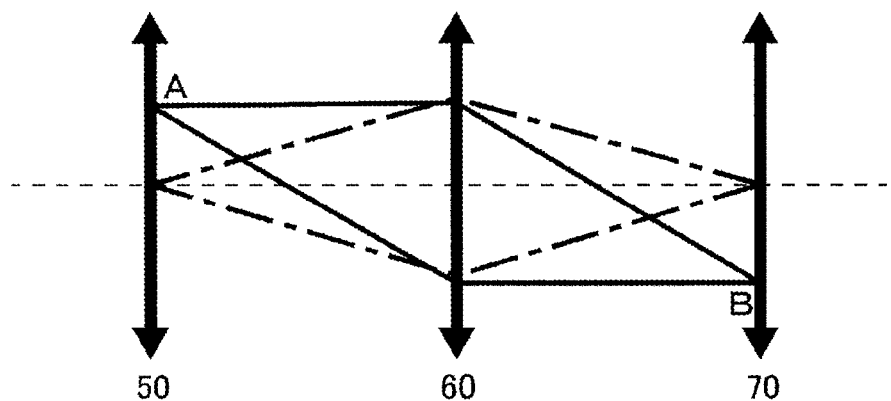
FIG. 6A is an explanatory diagram of the case in which the first diffractive element and the second diffractive element are in a conjugate relation.
Figure 6B:
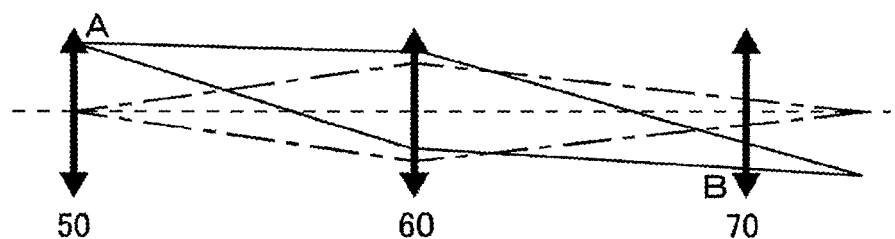
FIG. 6B is an explanatory diagram of the case in which the first diffractive element and the second diffractive element are not in the conjugate relation.
Figure 6C:
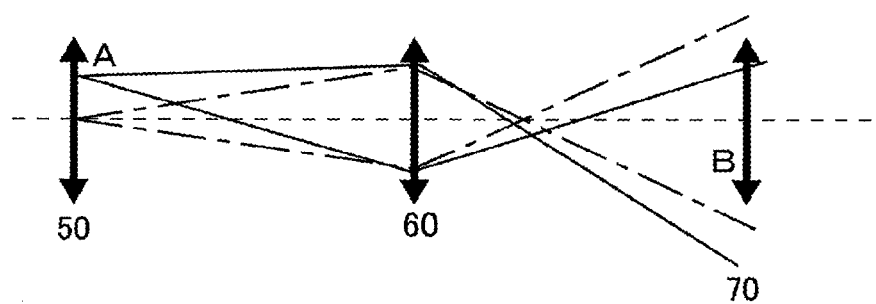
FIG. 6C is an explanatory diagram of the case in which the first diffractive element and the second diffractive element are not in the conjugate relation.
Figure 7A:
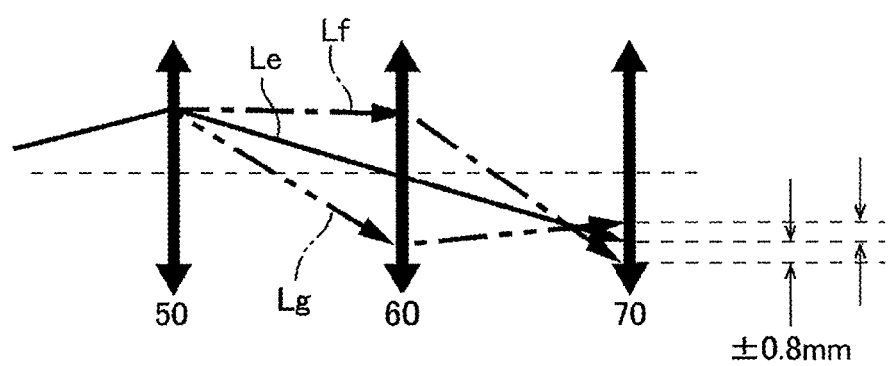
FIG. 7A is an explanatory diagram showing allowable tolerance of a shift from the conjugate relation between the first diffractive element and the second diffractive element.
Figure 7B:
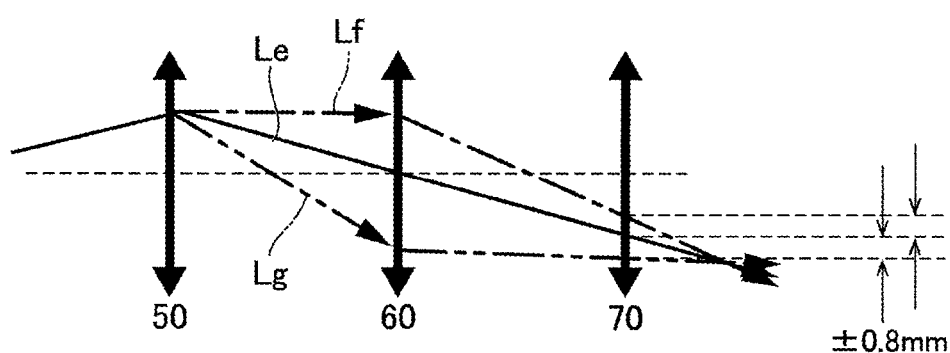
FIG. 7B is an explanatory diagram of another aspect showing the allowable tolerance of a shift from the conjugate relation.

FIG. 6A is an explanatory diagram of the case in which the first diffractive element 50 and the second diffractive element 70 are in the conjugate relation. FIG. 6B and FIG. 6C are each an explanatory diagram of the case in which the first diffractive element 50 and the second diffractive element 70 are not in the conjugate relation. FIG. 7A and FIG. 7B are explanatory diagrams showing an allowable tolerance of the shift from the conjugate relation between the first diffractive element 50 and the second diffractive element 70 shown in FIG. 6B and FIG. 6C. In FIG. 7A and FIG. 7B, the light with the specific wavelength is represented by the solid lines Le, the light having the wavelength of (specific wavelength) $-10$ nm is represented by the dashed-dotted lines Lf, and the light having the wavelength of (specific wavelength) $+10$ nm is represented by the dashed-two-dotted lines Lg. It should be noted that in FIGS. 6A through 6C, FIG. 7A and FIG. 7B, the first diffractive element 50, the second diffractive element 70 and the light guide system 60 are shown as ones of the transmissive type so that the procession of the light is easy to understand, and the first diffractive element 50, the second diffractive element 70 and the light guide system 60 are represented by the arrows.

As shown in FIG. 6A, in the case of making the first diffractive element 50 and the second diffractive element 70 have the conjugate relation, the diverging light emitted from a point A (a first position) of the first diffractive element 50 is converged by the light guide system 60 having the positive power, and then enters a point B (a second position corresponding to the first position) of the second diffractive element 70. Therefore, the color aberration due to the diffraction generated at the point B can be compensated at the point A.

In contrast, as shown in FIG. 6B and FIG. 6C, in the case in which the first diffractive element 50 and the second diffractive element 70 are not in the conjugate relation, the diverging light emitted from the point A of the first diffractive element 50 is converged by the light guide system 60 having the positive power, but enters the second diffractive element 70 so as to be focused at a position farther or nearer than the point B on the second diffractive element 70. Therefore, the point A and the point B are not in a one-to-one relation. Here, since the compensating effect increases in the case in which the interference stripes in the area is uniform, in the case in which the first diffractive element 50 and the second diffractive element 70 are not in the conjugate relation, the compensating effect weakens. In contrast, it is difficult to compensate the entire projection area of the second diffractive element 70 with the first diffractive element 50. Therefore, in the case of the configuration shown in FIG. 6B and FIG. 6C, the sufficient wavelength compensation cannot be performed, and therefore, deterioration of the resolution occurs.

It should be noted that in the light having the wavelength in a range of ±10 nm with respect to the specific wavelength, there exists an error in a range of about ±0.4 mm from the point B reached by the light with the specific wavelength, but the deterioration of the resolution is inconspicuous. As a result of considering such an allowable range, in the case in which the light is focused in front of the ideal point B on the second diffractive element 70 reached by the light with the specific wavelength, and enters a range of ±0.8 mm from the point B as shown in FIG. 7A, the deterioration of the resolution is inconspicuous. Further, in the case in which the light is focused behind the ideal point B on the second diffractive element 70 reached by the light with the specific wavelength, and enters the range of ±0.8 mm from the point B as shown in FIG. 7B, the deterioration of the resolution is inconspicuous. Therefore, in the first diffractive element 50 and the second diffractive element 70, even if the complete conjugate relation is not achieved, in the case in which the roughly conjugate relation is achieved, and the light reaches the range of ±0.8 mm from the ideal point B, the deterioration of the resolution can be allowed. In other words, in the present embodiment, the expression that the first diffractive element 50 and the second diffractive element 70 have the conjugate relation means the fact that the incident position of the light with the specific wavelength falls within the error range of ±0.8 mm from the ideal incident point.

Figure 8:
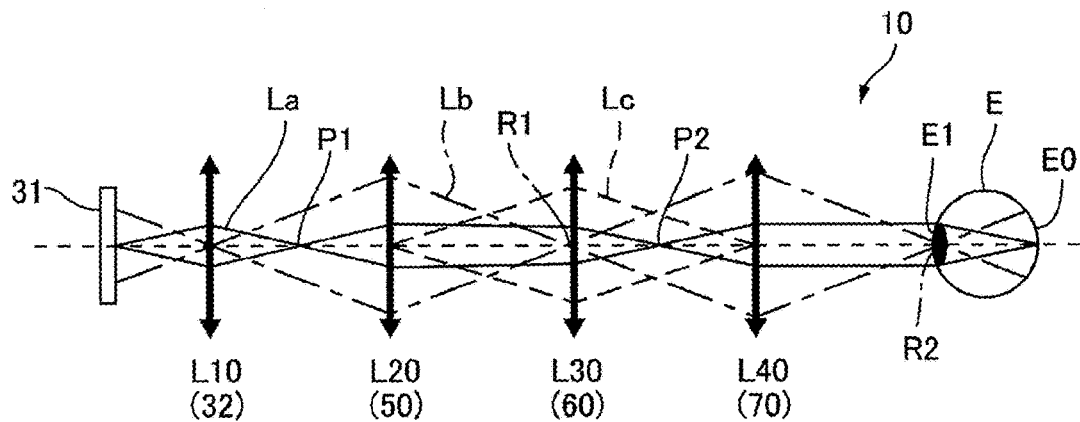
FIG. 8 is a ray diagram of the optical system.

FIG. 8 is a ray diagram in the optical system 10 of the present embodiment. In FIG. 8 and diagrams referred to later, the optical sections arranged along the optical axis are represented by the thick arrows. Further, a light beam emitted from one pixel of the image light generation device 31 is represented by the solid lines La, a principal light bean emitted from an end part of the image light generation device 31 is represented by the dashed-dotted lines Lb, and a position having the conjugate relation with the first diffractive element 50 is represented by the long dotted lines Lc. Here, an "intermediate image" denotes a place where the light beam (the solid lines La) having been emitted from the one pixel is focused, and a "pupil" denotes a place where the principal light beam (the dashed-dotted lines Lb) with each field angle is focused. Further, FIG. 8 shows the procession of the light emitted from the image light generation device 31. It should be noted that in FIG. 8, in order to simplify the drawings, all of the optical sections are illustrated as ones of the transmissive type.

As shown in FIG. 8, in the optical system 10 of the present embodiment, the first optical section L10 having the positive power, the second optical section L20 provided with the first diffractive element 50 and having the positive power, the third optical section L30 having the positive power, and the fourth optical section L40 provided with the second diffractive element 70 and having the positive power are disposed along the light path of the image light emitted from the image light generation device 31.

The focal distance of the first optical section L10 is L/2, and the focal distances of the second optical section L20, the third optical section L30, and the fourth optical section L40 are all L. Therefore, the optical distance from the second optical section L20 to the third optical section L30 and the optical distance from the third optical section L30 to the fourth optical section L40 are equal to each other.

In such an optical system 10, a first intermediate image P1 of the image light is formed between the first optical section L10 and the third optical section L30, a pupil R1 is formed between the second optical section L20 and the fourth optical section L40, a second intermediate image P2 of the image light is formed between the third optical section L30 and the fourth optical section L40, and the fourth optical section L40 collimates the image light to form an exit pupil R2. On this occasion, the third optical section L30 arbitrarily controls the image light having been emitted from the second optical section L20 into diverging light, converging light or parallel light, and then make the image light enter the fourth optical section L40. The second optical section L20 makes the image light having been emitted from the first optical section L10 enter the third optical section L30 as converging light. In the optical system 10 of the present embodiment, the pupil R1 is formed in the vicinity of the third optical section L30 between the second optical section L2 and the fourth optical section L40. The vicinity of the third optical section L30 means a position nearer to the third optical section L30 than to the second optical section L20 between the second optical section L20 and the third optical section L30, or a position nearer to the third optical section L30 than to the fourth optical section L40 between the third optical section L30 and the fourth optical section L40.

Further, the third optical section L30 makes the light having the peripheral wavelength deflected by the first diffractive element 50 to be shifted from the light having the specific wavelength enter a predetermined range of the second diffractive element 70 with respect to the image light from the one point of the image light generation device 31. In other words, the first diffractive element 50 and the second diffractive element 70 are in the conjugate relation or the roughly conjugate relation. Here, an absolute value of the magnifying power of the projection on the second diffractive element 70 due to the third optical section L30 of the first diffractive element 50 is in a range from 0.5 times to 10 times, and is preferably in a range from the same size to 5 times.

Therefore, according to the optical system 10 of the present embodiment, the first intermediate image P1 of the image light is formed between the projection optical system 32 and the light guide system 60, the pupil R1 is formed in the vicinity of the light guide system 60, the second intermediate image P2 of the image light is formed between the light guide system 60 and the second diffractive element 70, and the second diffractive element collimates the image light to form the exit pupil R2.

In the optical system 10 of the present embodiment, the first intermediate image P1 is formed between the first optical section L10 (the projection optical system 32) and the second optical section L20 (the first diffractive element 50).

According to the optical system 10 of the present embodiment, the four conditions (conditions 1, 2, 3 and 4) described below are fulfilled.

Condition 1: The light beam having been emitted from one point of the image light generation device 31 is imaged on the retina E0 as one point.

Condition 2: The entrance pupil of the optical system and the pupil of the eyeball are conjugated.

Condition 3: The first diffractive element 50 and the second diffractive element 70 are appropriately arranged so as to compensate the peripheral wavelength.

Condition 4: The first diffractive element 50 and the second diffractive element 70 are in the conjugate relation or the roughly conjugate relation.

More specifically, as is understood from the solid lines La shown in FIG. 8, since the condition 1 that the light beam having been emitted from one point of the image light generation device 31 is imaged on the retina E0 as one point is fulfilled, it is possible for the observer to visually recognize the one pixel. Further, as is understood from the solid lines La shown in FIG. 8, since the condition 2 that the entrance pupil of the optical system 10 and a pupil E1 of the eye E are in the conjugate relation (conjugate between pupils) is fulfilled, it is possible to visually recognize the entire area of the image generated by the image light generation device 31. Further, since the condition 3 that the first diffractive element 50 and the second diffractive element 70 are appropriately arranged so as to compensate the peripheral wavelength is fulfilled, the color aberration generated in the second diffractive element 70 can be canceled by performing the wavelength compensation. Further, as is understood from the long dotted lines Lc shown in FIG. 8, since the condition that the first diffractive element 50 and the second diffractive element 70 are in the conjugate relation or the roughly conjugate relation is fulfilled, it is possible to make the light beam enter the place where the interference stripes are the same between the first diffractive element 50 and the second diffractive element 70, and therefore, it is possible to appropriately perform the wavelength compensation. Therefore, it is possible to suppress the deterioration of the resolution of the image light.

First Modified Example

Figure 9:
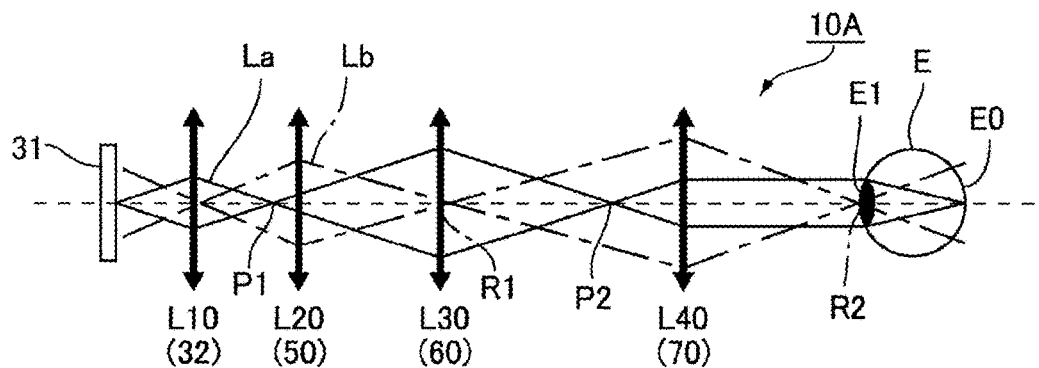
FIG. 9 is a ray diagram of an optical system related to a first modified example.

FIG. 9 is a ray diagram of an optical system 10A related to a first modified example. As shown in FIG. 9, in the optical system 10A of the present modified example, the first optical section L10 (the projection optical system 32) having the positive power, the second optical section L20 provided with the first diffractive element 50 and having the positive power, the third optical section L30 (the light guide system 60) having the positive power, and the fourth optical section L40 provided with the second diffractive element 70 of a reflective type and having the positive power are disposed along the light path of the image light emitted from the image light generation device 31.

The focal distance of the first optical section L10 is 4L/11, the focal distance of the second optical section L20 is 6L/11, the focal distance of the third optical section L30 is 3L/4, and the focal distance of the fourth optical section L40 is L. Therefore, the ratio between the optical distance from the second optical section L20 to the third optical section L30 and the optical distance from the third optical section L30 to the fourth optical section L40 is 1:2, and the optical distance from the second optical section L20 to the third optical section L30 is shorter than the optical distance from the third optical section L30 to the fourth optical section L40. Therefore, even in the case of reducing the size of the optical system 10, it is hard for the vision to be blocked by the third optical section L30.

Also in the present modified example, similarly to the configuration of the first embodiment described with reference to FIG. 8, the first intermediate image P1 of the image light is formed between the first optical section L10 and the third optical section L30, the pupil R1 is formed in the vicinity of the third optical section L30, the second intermediate image P2 of the image light is formed between the third optical section L30 and the fourth optical section L40, and the fourth optical section L40 collimates the image light to form the exit pupil R2. In the present modified example, similarly to the configuration of the first embodiment, the first intermediate image P1 is formed between the first optical section L10 (the projection optical system 32) and the second optical section L20 (the first diffractive element 50).

Also in the optical system 10A of the present modified example, similarly to the configuration of the first embodiment, the condition 1 that the light beam having been emitted from one point of the image light generation device 31 is imaged on the retina E0 as one point is fulfilled. Further, the condition 2 that the entrance pupil of the optical system 10A and the pupil E1 of the eye E are in the conjugate relation (conjugate between the pupils) is fulfilled. Further, the condition 3 that the first diffractive element 50 and the second diffractive element 70 are appropriately arranged is fulfilled. Further, since the condition 4 that the first diffractive element 50 and the second diffractive element 70 are in the conjugate relation or the roughly conjugate relation is fulfilled, it is possible to make the light beam enter the place where the interference stripes are the same between the first diffractive element 50 and the second diffractive element 70, and therefore, it is possible to cancel the color aberration by appropriately performing the wavelength compensation. Therefore, it is possible to suppress the deterioration of the resolution of the image light.

Second Modified Example

Figure 10:
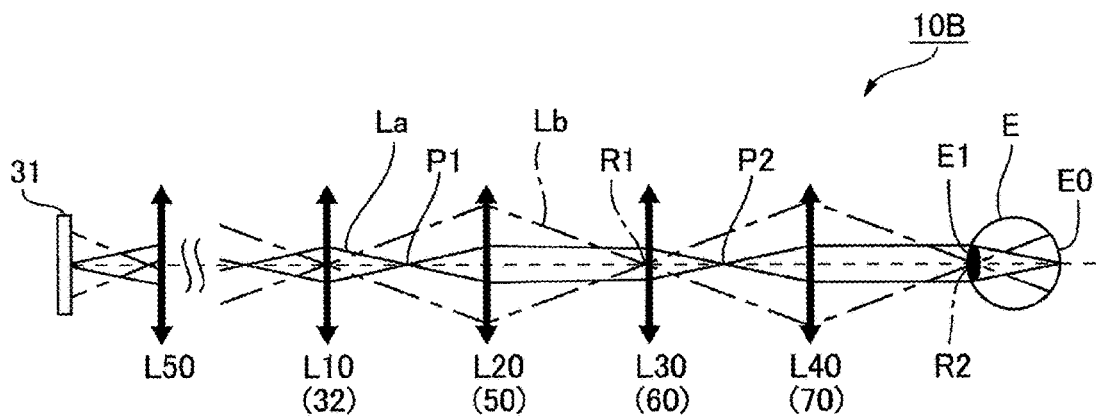
FIG. 10 is a ray diagram of an optical system related to a second modified example.

FIG. 10 is a ray diagram of an optical system 10B related to a second modified example. As shown in FIG. 10, in the optical system 10B of the present modified example, the first optical section L10 (the projection optical system 32) having the positive power, the second optical section L20 provided with the first diffractive element 50 and having the positive power, the third optical section L30 (the light guide system 60) having the positive power, and the fourth optical section L40 provided with the second diffractive element 70 of a reflective type and having the positive power are disposed along the light path of the image light emitted from the image light generation device 31. In the present modified example, a fifth optical section L50 is disposed between the image light generation device 31 and the projection optical system 32.

Also in the present modified example, similarly to the configuration of the first embodiment described with reference to FIG. 8, the first intermediate image P1 of the image light is formed between the first optical section L10 and the third optical section L30, the pupil R1 is formed in the vicinity of the third optical section L30, the second intermediate image P2 of the image light is formed between the third optical section L30 and the fourth optical section L40, and the fourth optical section L40 collimates the image light to form the exit pupil R2. Also in the present modified example, similarly to the configuration of the first embodiment, the first intermediate image P1 is formed between the first optical section L10 (the projection optical system 32) and the second optical section L20 (the first diffractive element 50). Specifically, in the case of defining the position where the image light generation device 31 is disposed in the configuration of the first embodiment described with reference to FIG. 8 as a virtual panel position, in the configuration shown in FIG. 10, the image light generation device 31 is disposed on the opposite side to the first optical section L10 from the virtual panel position, and the distance between the image light generation device 31 and the first optical section L10 is longer than the distance between the image light generation device 31 and the first optical section L10 in the configuration of the first embodiment described with reference to FIG. 8. Even in such a case, since the fifth optical section L50 is disposed between the image light generation device 31 and the projection optical system 32, the light beam having been emitted from the image light generation device 31 becomes substantially the same as in the configuration of the first embodiment described with reference to FIG. 8 after reaching the first optical section L10.

Therefore, also in the optical system 10B of the present modified example, similarly to the configuration of the first embodiment, the condition 1 that the light beam having been emitted from one point of the image light generation device 31 is imaged on the retina E0 as one point is fulfilled. Further, the condition 2 that the entrance pupil of the optical system 10B and the pupil E1 of the eye E are in the conjugate relation (conjugate between the pupils) is fulfilled. Further, the condition 3 that the first diffractive element 50 and the second diffractive element 70 are appropriately arranged is fulfilled. Further, since the condition 4 that the first diffractive element 50 and the second diffractive element 70 are in the conjugate relation or the roughly conjugate relation is fulfilled, it is possible to make the light beam enter the place where the interference stripes are the same between the first diffractive element 50 and the second diffractive element 70, and therefore, it is possible to cancel the color aberration by appropriately performing the wavelength compensation. Therefore, it is possible to suppress the deterioration of the resolution of the image light.

Third Modified Example

Figure 11:
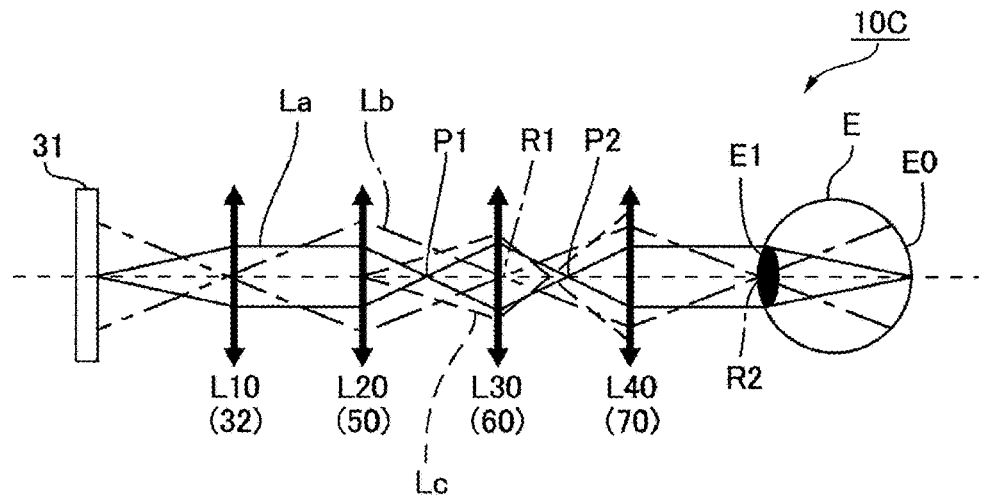
FIG. 11 is a ray diagram of an optical system related to a third modified example.

FIG. 11 is a ray diagram of an optical system 100 related to a third modified example. As shown in FIG. 11, in the optical system 100 of the present modified example, the first optical section L10 (the projection optical system 32) having the positive power, the second optical section L20 provided with the first diffractive element 50 and having the positive power, the third optical section L30 (the light guide system 60) having the positive power, and the fourth optical section L40 provided with the second diffractive element 70 of a reflective type and having the positive power are disposed along the light path of the image light emitted from the image light generation device 31.

Also in the present modified example, similarly to the configurations of the first embodiment, the first modified example and the second modified example, the first intermediate image P1 of the image light is formed between the first optical section L10 and the third optical section L30, the pupil R1 is formed in the vicinity of the third optical section L30, the second intermediate image P2 of the image light is formed between the third optical section L30 and the fourth optical section L40, and the fourth optical section L40 collimates the image light to form the exit pupil R2.

In the present modified example, unlike the configurations of the first embodiment, the first modified example and the second modified example, the first intermediate image P1 is formed between the second optical section L20 (the first diffractive element 50) and the third optical section L30 (the light guide system 60).

Also in such an optical system 100, similarly to the configuration of the first embodiment, the condition 1 that the light beam having been emitted from one point of the image light generation device 31 is imaged on the retina E0 as one point is fulfilled. Further, the condition 2 that the entrance pupil of the optical system 100 and the pupil E1 of the eye E are in the conjugate relation (conjugate between the pupils) is fulfilled. Further, the condition 3 that the first diffractive element 50 and the second diffractive element 70 are appropriately arranged is fulfilled. It should be noted that in the optical system 100 of the present modified example, the condition 4 that the first diffractive element 50 and the second diffractive element 70 are in the conjugate relation or the roughly conjugate relation is not fulfilled. Even in this case, it is possible for the third optical section L30 to make the light deflected by the first diffractive element 50 to be shifted from the light having the specific wavelength enter a predetermined range of the second diffractive element 70 with respect to the image light from the one point of the image light generation device 31. Therefore, the problem that the light enters the place different in interference stripes is compensated by the third optical section L30. Therefore, it becomes possible for the light having the peripheral wavelength of the specific wavelength to enter the vicinity of the light with the specific wavelength, and it is possible to roughly cancel the color aberration by performing the wavelength compensation. Therefore, it is possible to suppress the deterioration of the resolution. In other words, according to the optical system 10C of the present modified example, it is possible to obtain a certain wavelength compensation effect in the case in which the aperture ratio is low although the wavelength compensation effect is low compared to the configuration of the first embodiment and so on.

Fourth Modified Example

Figure 12:
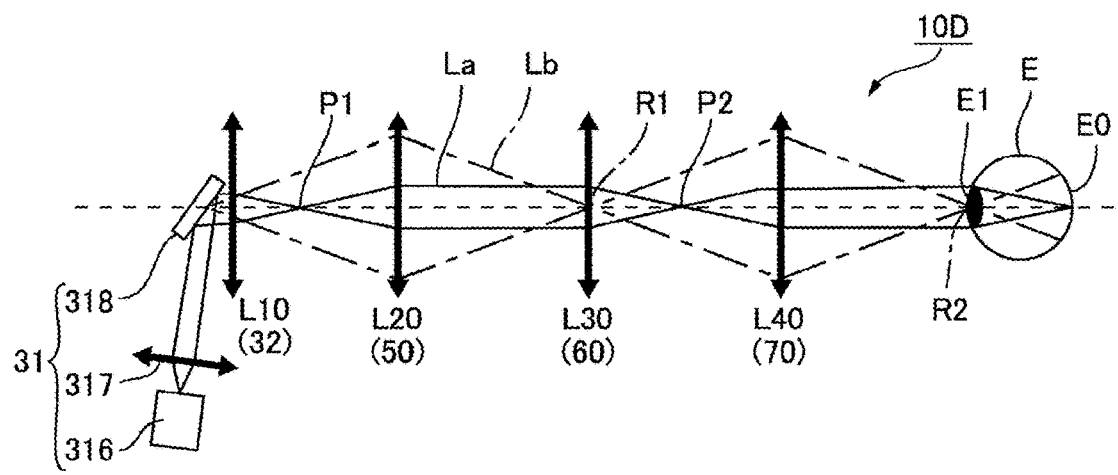
FIG. 12 is a ray diagram of an optical system related to a fourth modified example.
Figure 13:
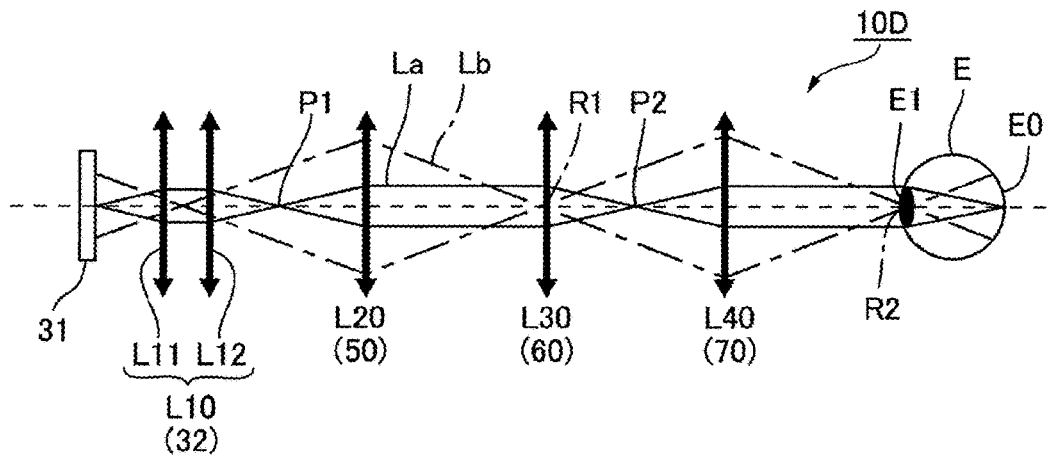
FIG. 13 is an explanatory diagram of a first optical section in the optical system of the fourth modified example.

FIG. 12 is a ray diagram of an optical system 10D related to a fourth modified example. FIG. 13 is an explanatory diagram of the first optical section L10 related to the present modified example. As shown in FIG. 12, in the optical system 10D of the present modified example, similarly to the configuration of the first embodiment described with reference to FIG. 8, the first optical section L10 (the projection optical system 32) having the positive power, the second optical section L20 provided with the first diffractive element 50 and having the positive power, the third optical section L30 (the light guide system 60) having the positive power, and the fourth optical section L40 provided with the second diffractive element 70 of a reflective type and having the positive power are disposed. Here, the image light generation device 31 has a laser source 316, a collimating lens 317, and a micromirror device 318, and the image is generated by driving the micromirror device 318 to thereby perform the scan with the laser source 316. Therefore, the image light generation device 31 itself forms the light of the field angle.

Therefore, as shown in FIG. 13, compared to the case of forming the pupil between the lenses L11, L12 used in the first optical section L10 in the configuration of the first embodiment described with reference to FIG. 8, the image light generation device 31 and the lens L11 are replaced with the laser source 316, the collimating lens 317 and the micromirror device 318 described above.

According to such an optical system 10D, in the case of wearing the display device 100, even in the case in which a temperature change occurs due to the body heat and the heat of the display device 100 itself to cause a variation in the spectrum width of the laser beam and so on, it is possible to display an image high in quality due to the wavelength compensation.

Second Embodiment

Then, a display device according to a second embodiment will be described. The present embodiment relates to another configuration in the optical system.

Figure 14:
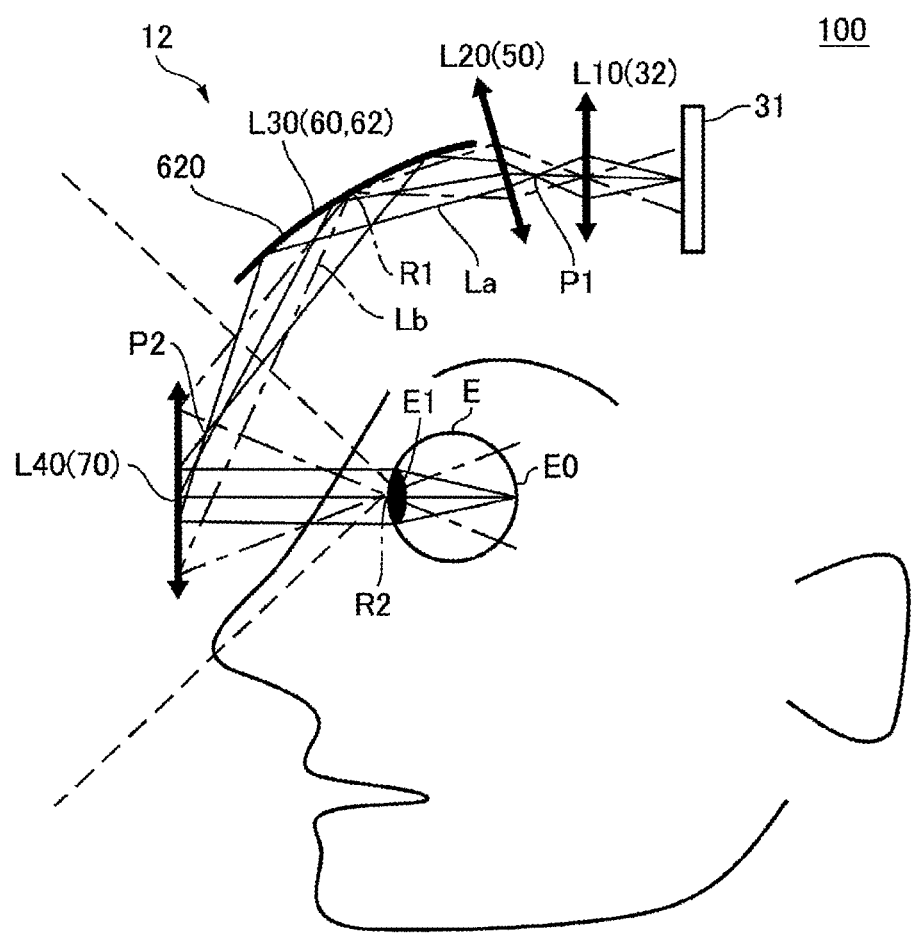
FIG. 14 is an explanatory diagram of an optical system related to a second embodiment.

FIG. 14 is an explanatory diagram of the display device according to the second embodiment. An optical system 12 shown in FIG. 14 is disposed along the vertical direction as shown in FIG. 2, and the projection optical system 32, the first diffractive element 50 and the light guide system 60 are disposed in an area from the image light generation device 31 disposed at the top of the head to the second diffractive element 70 in front of the eye E. In the present embodiment, the light guide system 60 is formed of a mirror 62 having a reflecting surface 620 recessed in the central part from the peripheral part, and has positive power. The reflecting surface 620 is formed of a spherical surface, aspherical surface, or a free-form surface. In the present embodiment, the reflecting surface 620 is formed of the free-form surface. The first diffractive element 50 is formed of a transmissive volume holographic element and a lens integrated with each other, and has positive power. It should be noted that the first diffractive element 50 itself is configured to have the positive power in some cases.

In the optical system 12 of the present embodiment, similarly to the first modified example described with reference to FIG. 9, the first optical section L10 (the projection optical system 32) having the positive power, the second optical section L20 provided with the first diffractive element 50 and having the positive power, the third optical section L30 (the mirror 62 of the light guide system 60) having the positive power, and the fourth optical section L40 provided with the second diffractive element 70 of a reflective type and having the positive power are disposed along the light path of the image light emitted from the image light generation device 31. Therefore, the first intermediate image P1 of the image light is formed between the first optical section L10 and the third optical section L30, the pupil R1 is formed in the vicinity of the third optical section L30, the second intermediate image P2 of the image light is formed between the third optical section L30 and the fourth optical section L40, and the fourth optical section L40 collimates the image light to form the exit pupil R2.

Here, the third optical section L30 is constituted by the mirror 62 having the positive power. Therefore, the diverging light having been diffracted by the second optical section L20 is converged by the mirror 62. Further, the light having been converged enters the point which the light with the specific wavelength enters and the vicinity of the point of the fourth optical section L40 (the second diffractive element 70).

Also in the optical system 12 of the present embodiment, similarly to the first modified example described with reference to FIG. 9, the condition 1 that the light beam having been emitted from one point of the image light generation device 31 is imaged on the retina E0 as one point is fulfilled. Further, the condition 2 that the entrance pupil of the optical system 12 and the pupil E1 of the eye E are in the conjugate relation (conjugate between the pupils) is fulfilled. Further, the condition 3 that the first diffractive element 50 and the second diffractive element 70 are appropriately arranged is fulfilled. Further, since the condition 4 that the first diffractive element 50 and the second diffractive element 70 are in the conjugate relation or the roughly conjugate relation is fulfilled, it is possible to make the light beam enter the place where the interference stripes are the same between the first diffractive element 50 and the second diffractive element 70, and therefore, it is possible to cancel the color aberration by appropriately performing the wavelength compensation. Therefore, it is possible to suppress the deterioration of the resolution of the image light.

Third Embodiment

Then, a display device according to a third embodiment will be described. The present embodiment relates to another configuration in the optical system.

Figure 15:
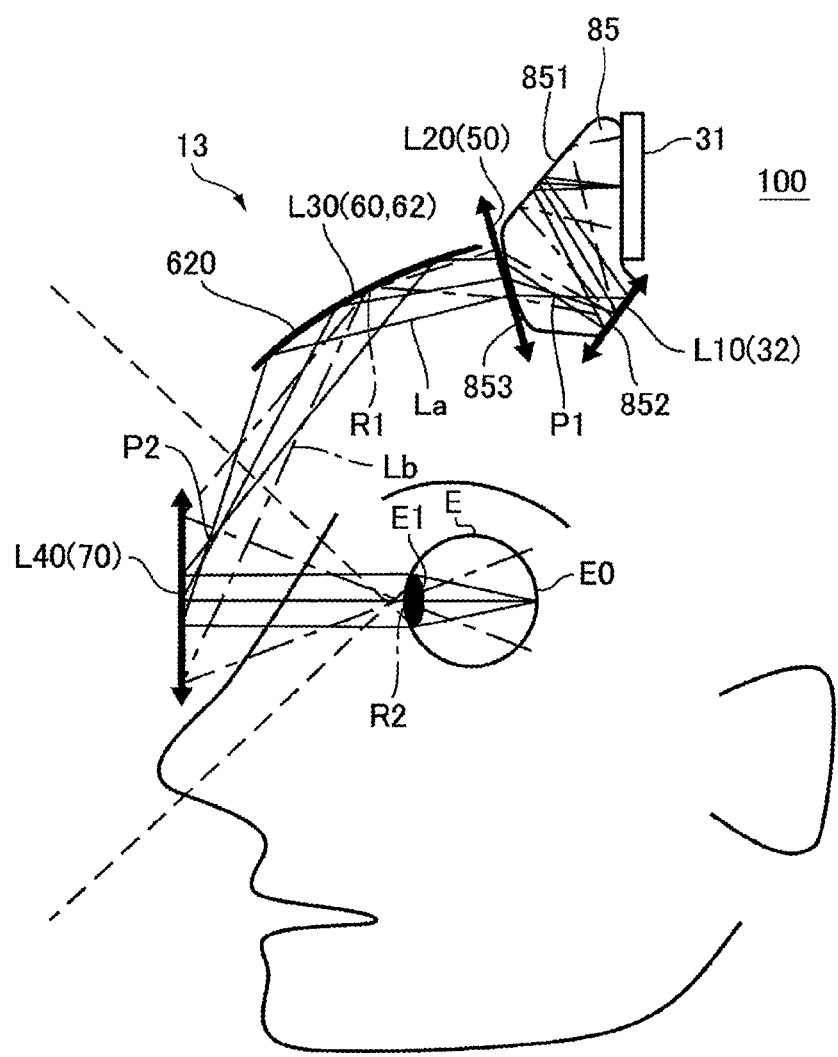
FIG. 15 is an explanatory diagram of an optical system related to a third embodiment.

FIG. 15 is an explanatory diagram of the display device according to the third embodiment. In the optical system 12 shown in FIG. 14, the first optical section L10 (the projection optical system 32) and the second optical section L20 (the first diffractive element 50) are separated from each other, but in an optical system 13 of the present embodiment, the first optical section L10 (the projection optical system) and the second optical section L20 (the first diffractive element 50) are integrated with each other as shown in FIG. 15. More specifically, the first optical section L10 (the projection optical system 32) is formed of a prism 85 provided with a plurality of reflecting surfaces 851, 852, and the second optical section L20 (the first diffractive element 50 of a transmissive type) is provided to an exit surface 853 of the prism 85.

The rest of the configuration is common to the second embodiment described with reference to FIG. 14. Therefore, similarly to the configuration shown in FIG. 14, the color aberration can be canceled by appropriately performing the wavelength compensation. Therefore, it is possible to suppress the deterioration of the resolution of the image light. Further, since the first optical section L10 (the projection optical system 32) and the second optical section L20 (the first diffraction element 50) are integrated with each other using the prism 85, it is possible to achieve reduction of assembling tolerance, reduction in size in the anteroposterior direction of the head, and so on.

Fourth Embodiment

Then, a display device according to a fourth embodiment will be described. The present embodiment relates to another configuration in the optical system.

Figure 16:
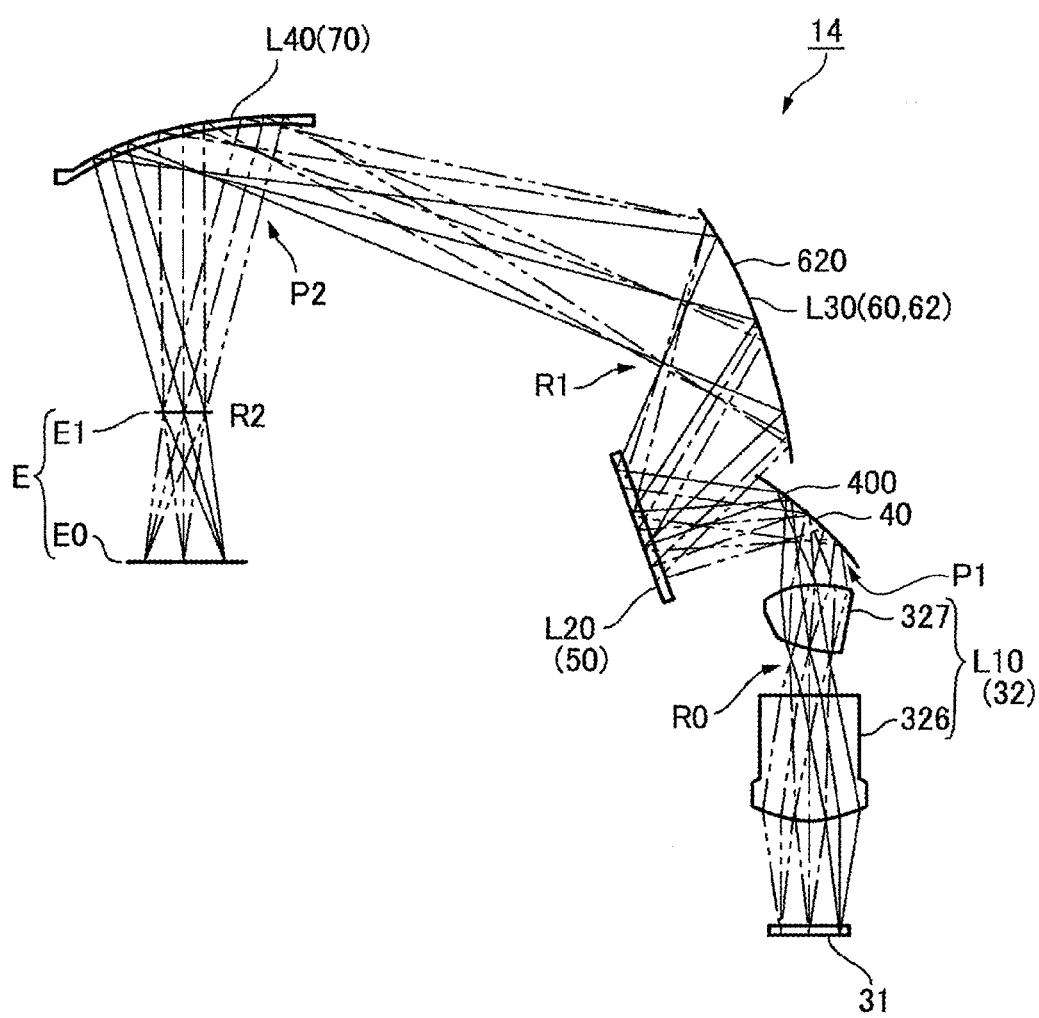
FIG. 16 is an explanatory diagram of an optical system related to a fourth embodiment.

FIG. 16 is an explanatory diagram of the display device according to the fourth embodiment. Similarly to the configuration described with reference to FIG. 1 and FIG. 3, in an optical system 14 shown in FIG. 16, the projection optical system 32, the first diffractive element 50 and the light guide system 60 are disposed in an area from the image light generation device 31 disposed at the side of the head to the second diffractive element 70 in front of the eye E. In the present embodiment, the projection optical system 32 has a lens 326 having a rotationally-symmetrical shape, and a lens 327 having a free-form surface. The light guide system 60 is formed of the mirror 62 having the reflecting surface 620 recessed in the central part from the peripheral part, and has positive power. The reflecting surface 620 is formed of a spherical surface, aspherical surface, or a free-form surface. In the present embodiment, the reflecting surface 620 is formed of the free-form surface. The first diffractive element 50 is formed of a reflective volume holographic element. A mirror 40 is disposed at an intermediate position in the light path starting from the projection optical system 32 and reaching the first diffractive element 50, and the projection optical system 32 forms the intermediate image (the first intermediate image P1) on the reflecting surface of the mirror 40 or in the vicinity of the reflecting surface. The mirror 40 is provided with a concavely curved surface as the reflecting surface 400, and has the positive power. In the case in which the reflecting surface 400 of the mirror 40 has the positive power, it is possible to arrange that the mirror 40 is included in the constituents of the projection optical system 32. In other words, in the case in which the mirror 40 has the positive power, it is also possible to arrange that the first optical section L10 includes the mirror 40. It should be noted that it is also possible to adopt a configuration in which the reflecting surface 400 of the mirror 40 is formed as a flat surface and has no power.

In the optical system 14 configured in such a manner, similarly to the first modified example described with reference to FIG. 9, the first optical section L10 (the projection optical system 32) having the positive power, the second optical section L20 provided with the first diffractive element 50 and having the positive power, the third optical section L30 (the mirror 62 of the light guide system 60) having the positive power, and the fourth optical section L40 provided with the second diffractive element 70 of a reflective type and having the positive power are disposed along the light path of the image light emitted from the image light generation device 31.

In the optical system 14 according to the present embodiment, the first optical section L10 includes the plurality of lenses 326, 327. The lens 326 out of the plurality of lenses 326, 327 is a lens located the nearest to the image light generation device 31. Therefore, the lens 326 corresponds to a "first lens."

In the optical system 14 of the present embodiment, a pupil R0 is formed between the lens 326 and the lens 327 in the first optical section L10, the pupil R1 is formed in the vicinity of the third optical section L30, the second intermediate image P2 of the image light is formed between the third optical section L30 and the fourth optical section L40, and the fourth optical section L40 collimates the image light to form the exit pupil R2.

The first intermediate image P1 and the second intermediate image P2 shown in FIG. 16 are each an intermediate image in the image light spreading in the horizontal direction along the surface of the sheet. The image light having been emitted from the image light generation device 31 spreads not only in the horizontal direction but also in the vertical direction perpendicular to the surface of the sheet of FIG. 16, and therefore, there exists an intermediate image of the image light spreading in the vertical direction. In the present embodiment, the intermediate image in the vertical direction exists in the vicinity of the intermediate image in the horizontal direction.

It should be noted that the first intermediate image P1 is formed in the vicinity of the mirror 40 in the optical system 14 of the present embodiment, but can also be formed in the first optical section L10 (the projection optical system 32).

Figure 17:
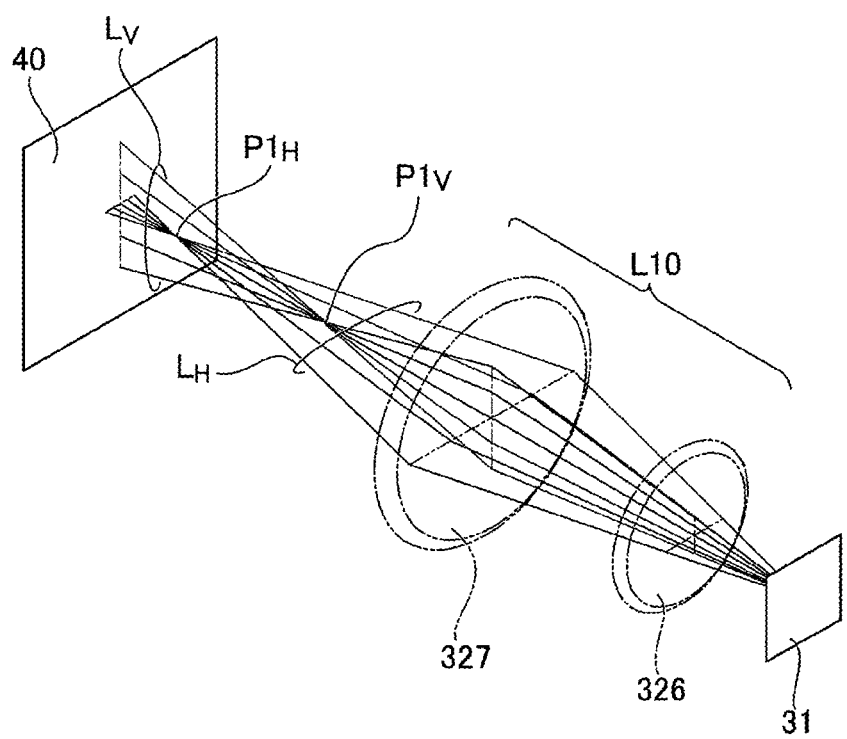
FIG. 17 is a diagram in which an intermediate image is different in position between a horizontal direction and a vertical direction.

Further, the intermediate image in the horizontal direction and the intermediate image in the vertical direction can also exist at respective positions different from each other. FIG. 17 is a ray diagram in the case in which the position of the intermediate image in the horizontal direction and the position of the intermediate image in the vertical direction are different from each other, and FIG. 17 is a ray diagram in the image light in the horizontal direction and the vertical direction. In FIG. 17, the reference symbol $L_H$ denotes the image light in the horizontal direction, the reference symbol $P1_H$ denotes the first intermediate image in the image light $L_H$ in the horizontal direction, the reference symbol $L_V$ denotes the image light in the vertical direction, and the reference symbol $P1_V$ denotes the first intermediate image in the image light $L_V$ in the vertical direction. Further, in FIG. 17, the image light generation device 31, the first optical section L10 (the projection optical system 32) and the mirror 40 disposed along the optical axis are schematically shown. Further, in FIG. 17, the shapes of the lenses 326, 327 constituting the projection optical system 32 are also simplified.

As shown in FIG. 17, the first intermediate image $P1_H$ in the horizontal direction is located in the vicinity of the mirror 40, and the first intermediate image $P1_V$ in the vertical direction is located closer to the first optical section L10 than the first intermediate image $P1_H$ in the horizontal direction.

In FIG. 17, there is shown the case in which the position of the intermediate image is different between the horizontal direction and the vertical direction in the first intermediate image P1, but it is also possible for the second intermediate image to be different in position between the horizontal direction and the vertical direction. Further, in the case in which the position of the intermediate image is different between the horizontal direction and the vertical direction in the first intermediate image P1, it is also possible that one of the first intermediate image $P1_H$ and the first intermediate image $P1_V$ is formed in the first optical section L10 and the other of the first intermediate image $P1_H$ and the first intermediate image $P1_V$ is formed outside the first optical section L10.

Also in the optical system 14 of the present embodiment, similarly to the first modified example described with reference to FIG. 9, the condition 1 that the light beam having been emitted from one point of the image light generation device 31 is imaged on the retina E0 as one point is fulfilled. Further, the condition 2 that the entrance pupil of the optical system 10 and the pupil E1 of the eye E are in the conjugate relation (conjugate between the pupils) is fulfilled. Further, the condition 3 that the first diffractive element 50 and the second diffractive element 70 are appropriately arranged is fulfilled. Further, since the condition 4 that the first diffractive element 50 and the second diffractive element 70 are in the conjugate relation or the roughly conjugate relation is fulfilled, it is possible to make the light beam enter the place where the interference stripes are the same between the first diffractive element 50 and the second diffractive element 70, and therefore, it is possible to cancel the color aberration by appropriately performing the wavelength compensation. Therefore, it is possible to suppress the deterioration of the resolution of the image light.

Further, out of the members shown in FIG. 16, as plastic, glass and so on constituting the light transmissive member, there is used an optical member having high dispersion and low dispersion combined with each other. Further, since the mirror 62 is used as the third optical section L30, the achromatic state is provided in the first optical section L10. Therefore, since the centroid position of the optical system 14 is shifted to the rear side Z2, there is an advantage that the burden on the nose of the user can be eased. Further, regarding the mirror 62, if a semi-transmissive mirror layer or an angular selective mirror layer is formed on a transparent member such as transparent resin or glass using a sputtering method or the like, it is possible to visually recognize the outside view via the mirror 62.

Fifth Embodiment

Then, a display device according to a fifth embodiment will be described. The present embodiment relates to another configuration in the optical system.

Figure 18:
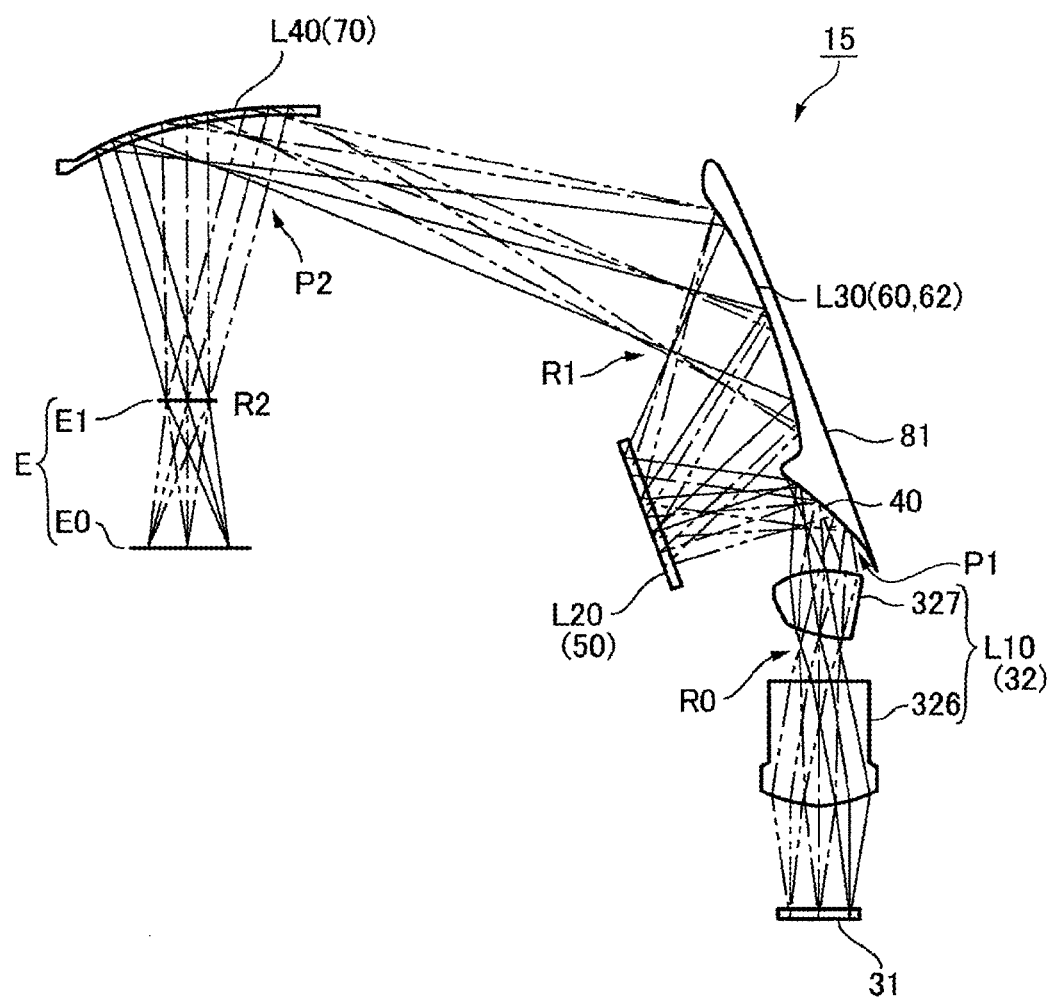
FIG. 18 is an explanatory diagram of an optical system related to a fifth embodiment.

FIG. 18 is an explanatory diagram of the display device according to the fifth embodiment. Similarly to the fourth embodiment described with reference to FIG. 16, in an optical system 15 shown in FIG. 18, the projection optical system 32 (the first optical section L10), the mirror 40, the first diffractive element 50 (the second optical section L20) and the mirror 62 (the third optical section L30) of the light guide system 60 are disposed in an area from the image light generation device 31 disposed at the side of the head to the second diffractive element 70 (the fourth optical section L40) in front of the eye E.

In the present embodiment, the mirror 40 and the mirror 62 are formed on different surfaces of a common member 81. The rest of the configuration is common to the fourth embodiment shown in FIG. 16. Therefore, similarly to the fourth embodiment shown in FIG. 16, it is possible to appropriately perform the wavelength compensation. Further, since the mirror 40 and the mirror 62 are provided to the common member 81, it is possible to achieve the reduction of the assembling tolerance and so on. Further, since it is possible to decrease the number of the types of the metal molds for manufacturing the mirror, it is possible to achieve the reduction of the cost.

Sixth Embodiment

Then, a display device according to a sixth embodiment will be described. The present embodiment relates to another configuration in the optical system.

Figure 19:
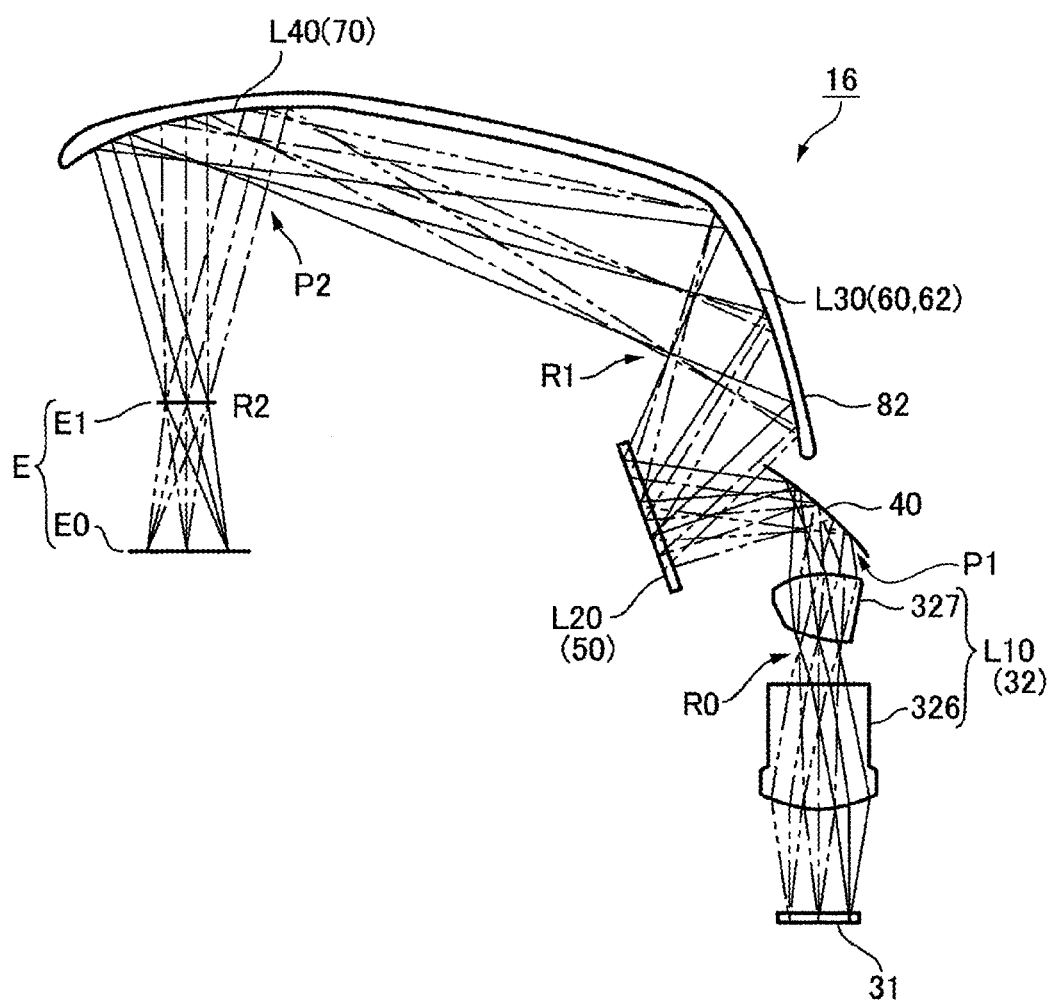
FIG. 19 is an explanatory diagram of an optical system related to a sixth embodiment.

FIG. 19 is an explanatory diagram of the display device according to the sixth embodiment. Similarly to the fourth embodiment described with reference to FIG. 16, in an optical system 16 shown in FIG. 19, the projection optical system 32 (the first optical section L10), the mirror 40, the first diffractive element 50 (the second optical section L20) and the mirror 62 (the third optical section L30) of the light guide system 60 are disposed in an area from the image light generation device 31 disposed at the side of the head to the second diffractive element 70 (the fourth optical section L40) in front of the eye E.

In the present embodiment, the mirror 62 and the second diffractive element 70 are formed on different surfaces of a common member 82. The rest of the configuration is common to the fourth embodiment shown in FIG. 16. Therefore, similarly to the fourth embodiment shown in FIG. 16, it is possible to appropriately perform the wavelength compensation. Further, since the mirror 62 and the second diffractive element 70 are provided to the common member 82, it is possible to achieve the reduction of the assembling tolerance and so on. Further, since it is possible to decrease the number of the types of the metal molds for manufacturing the mirror, it is possible to achieve the reduction of the cost.

Seventh Embodiment

Then, a display device according to a seventh embodiment will be described. The present embodiment relates to another configuration in the optical system.

Figure 20:
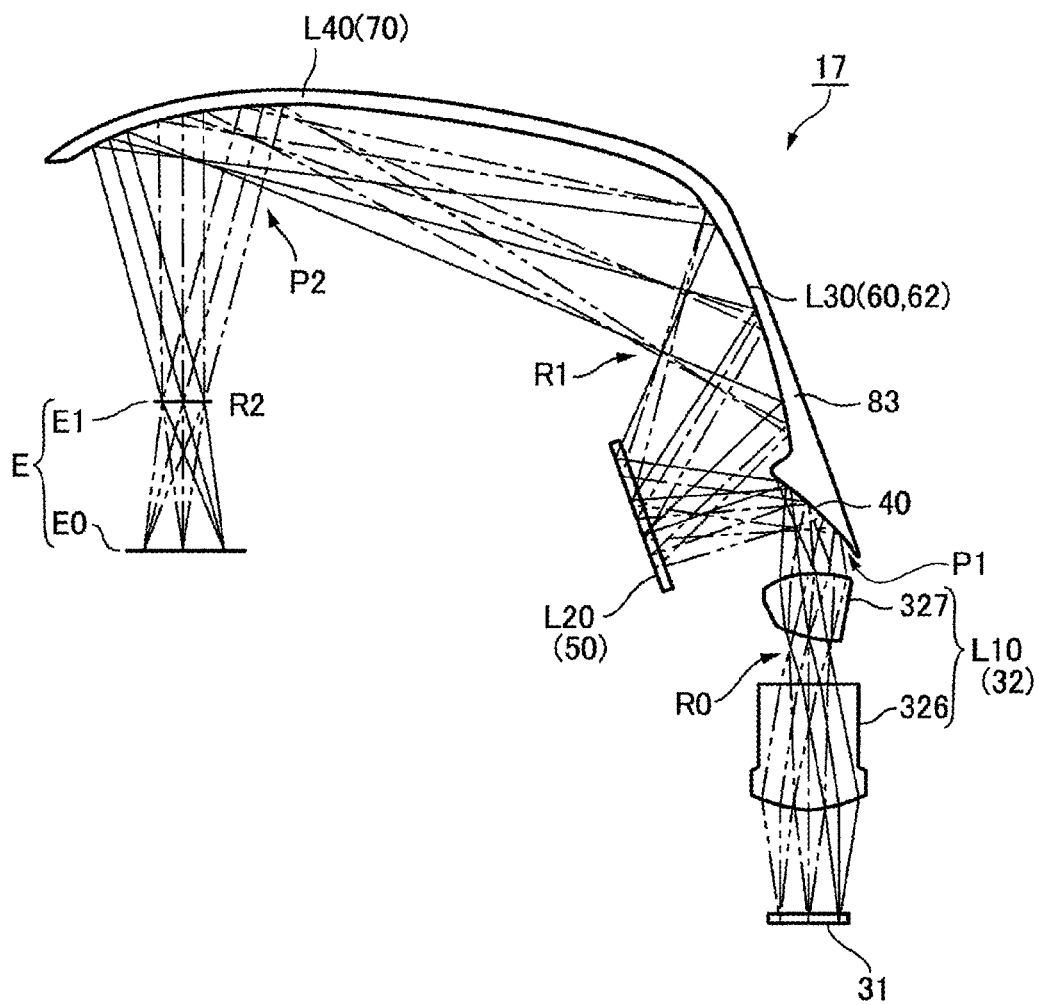
FIG. 20 is an explanatory diagram of an optical system related to a seventh embodiment.

FIG. 20 is an explanatory diagram of the display device according to the seventh embodiment. Similarly to the fourth embodiment described with reference to FIG. 16, in an optical system 17 shown in FIG. 20, the projection optical system 32 (the first optical section L10), the mirror 40, the first diffractive element 50 (the second optical section L20) and the mirror 62 (the third optical section L30) of the light guide system 60 are disposed in an area from the image light generation device 31 disposed at the side of the head to the second diffractive element 70 (the fourth optical section L40) in front of the eye E.

In the present embodiment, the mirror 40, the mirror 62 and the second diffractive element 70 are formed on different surfaces of a common member 83. The rest of the configuration is common to the fourth embodiment shown in FIG. 16. Therefore, similarly to the fourth embodiment shown in FIG. 16, it is possible to appropriately perform the wavelength compensation. Further, since the mirror 40, the mirror 62 and the second diffractive element 70 are provided to the common member 83, it is possible to achieve the reduction of the assembling tolerance and so on. Further, since it is possible to decrease the number of the types of the metal molds for manufacturing the mirror, it is possible to achieve the reduction of the cost.

Eighth Embodiment

Then, a display device according to an eighth embodiment will be described. The present embodiment relates to another configuration in the optical system. In an optical system of the present embodiment, the first diffractive element 50 and the second diffractive element 70 are in the roughly conjugate relation. The roughly conjugate relation between the first diffractive element 50 and the second diffractive element 70 will hereinafter be described.

Figure 21:
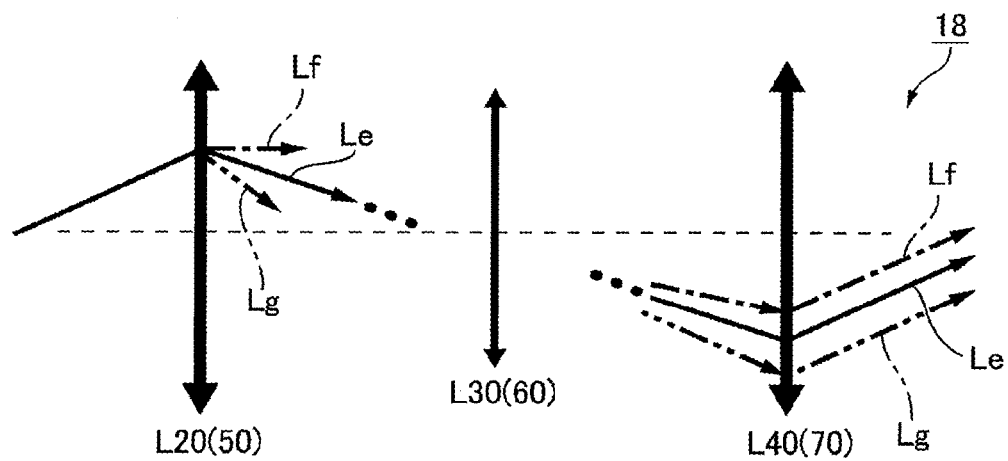
FIG. 21 is a diagram showing a roughly conjugate relation between a first diffractive element and a second diffractive element in an optical system related to an eighth embodiment.
Figure 22:
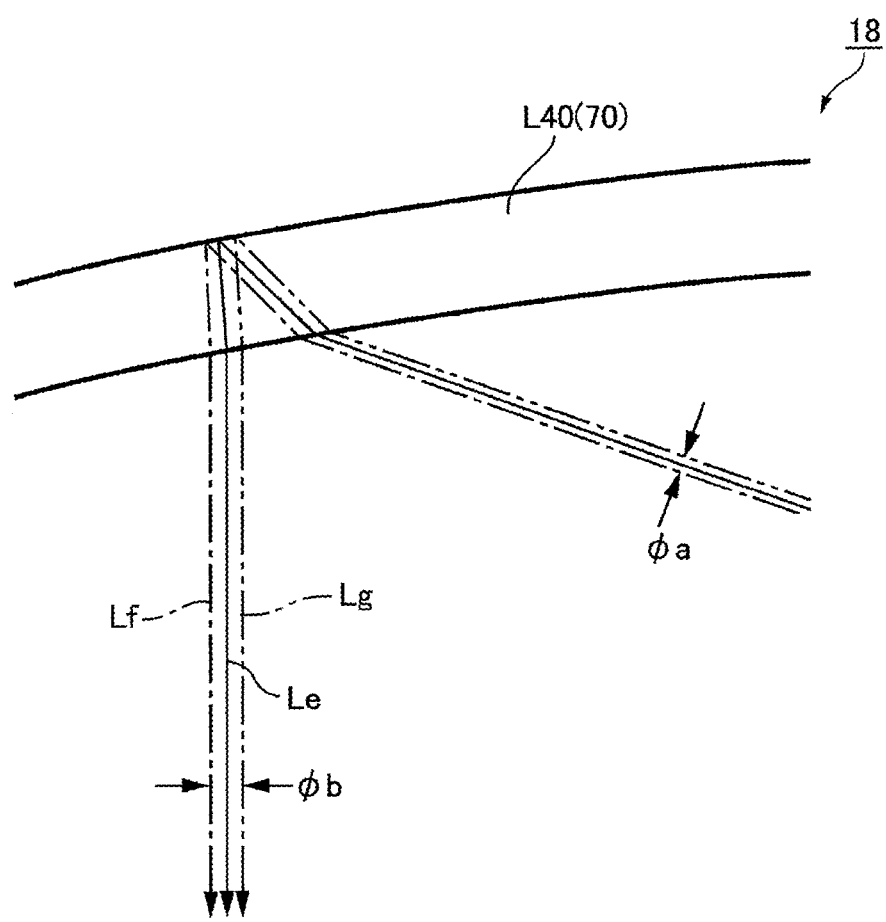
FIG. 22 is an explanatory diagram of the light emitted from the second diffractive element in the roughly conjugate relation shown in FIG. 21.
Figure 23:
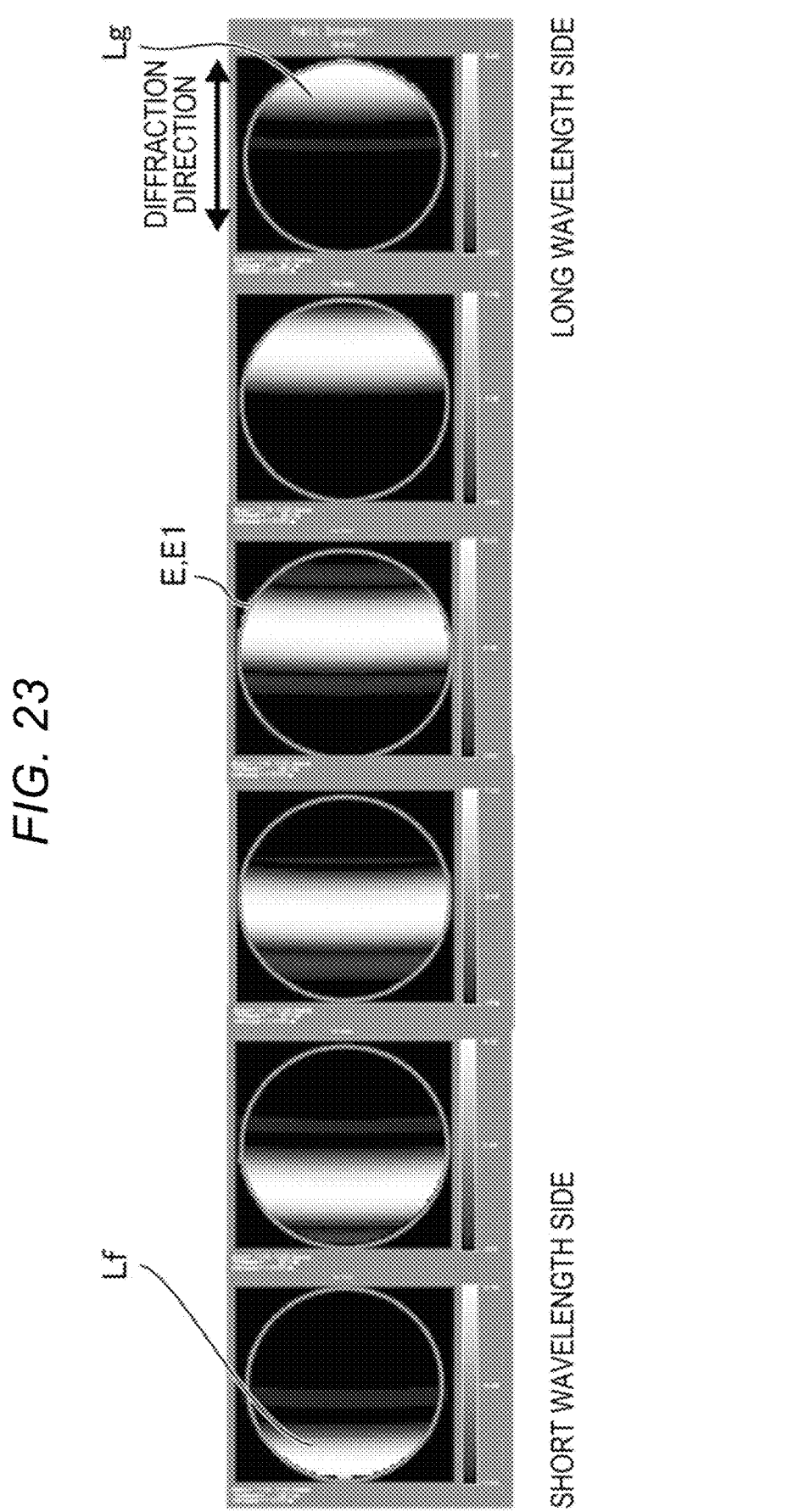
FIG. 23 is an explanatory diagram showing how the light shown in FIG. 22 enters the eye.

FIG. 21 is an explanatory diagram showing the roughly conjugate relation between the first diffractive element 50 and the second diffractive element 70 in an optical system 18 of the present embodiment. FIG. 22 is an explanatory diagram of the light emitted from the second diffractive element 70 in the roughly conjugate relation shown in FIG. 21. FIG. 23 is an explanatory diagram showing how the light shown in FIG. 22 enters the eye E. It should be noted that in FIG. 21, the light with the specific wavelength is represented by the solid lines Le, the light having the wavelength of (specific wavelength) −10 nm is represented by the dashed-dotted lines Lf, and the light having the wavelength of (specific wavelength) +10 nm is represented by the dashed-two-dotted lines Lg. In FIG. 23, how the light (the light represented by the dashed-dotted lines Lf in FIG. 22) having the wavelength of (specific wavelength) −10 nm enters the eye E is shown on the leftmost side of the observer of the drawing, how the light (the light represented by the dashed-two-dotted lines Lg in FIG. 22) having the wavelength of (specific wavelength) +10 nm enters the eye E is shown on the rightmost side of the observer of the drawing, and how the light having the wavelength varied from (specific wavelength) −10 nm to (specific wavelength) +10 nm enters the eye E is shown therebetween. It should be noted that how the light with the specific wavelength enters the eye E is not shown in FIG. 23, but how the light with the specific wavelength enters the eye E corresponds to an intermediate condition between the third condition from the left and the fourth condition from the left.

Although in the embodiment and so on described above, it is preferable to make the first diffractive element 50 and the second diffractive element 70 have the conjugate relation, the first diffractive element 50 and the second diffractive element 70 are made to have the roughly conjugate relation as described above in the present embodiment. In this case, as shown in FIG. 21, in the light having the peripheral wavelength shifted from the specific wavelength, the state when entering the second diffractive element 70 is different. Here, in the second diffractive element 70, the closer to the optical axis it becomes, the smaller the number of the interference stripes becomes, and the weaker the power for deflecting the light becomes. Therefore, by making the light on the long wavelength side enter the optical axis side, and making the light on the short wavelength side enter the end side, the light with the specific wavelength and the light with the peripheral wavelength are collimated, and therefore, it is possible to obtain substantially the same advantage as that of the wavelength compensation.

In this case, since the light beam position is shifted in accordance with the wavelength, the diameter of the light beam entering the pupil increases from the diameter φa to the diameter φb as shown in FIG. 22. FIG. 23 shows the condition of the intensity of the light beam entering the pupil on this occasion. As is understood from FIG. 23, although it is unachievable to fill the pupil in the vicinity of the specific wavelength, the light with the peripheral wavelength enters the position shifted from the position of the light with the specific wavelength, and can therefore fill the pupil diameter. As a result, it is possible to obtain the advantage that it becomes easy for the observer to observe the image.

Application to Other Display Devices

Although in the embodiment described above, there is illustrated the head-mounted display device 100, it is also possible to apply the invention to a head-up display, a hand-held display, an optical system for a projector, and so on.

The entire disclosure of Japanese Patent Application No.: 2018-011313, filed Jan. 26, 2018 and 2018-203691, filed Oct. 30, 2018 are expressly incorporated by reference herein.

What is claimed is:

1. A display device comprising:
an image light generation device;
a projection optical system;
a first diffractive element;
a first mirror; and
a second diffractive element,
wherein the projection optical system, the first diffractive element, the first mirror and the second diffractive element are disposed along a light path of image light emitted from the image light generation device,
a first intermediate image of the image light is formed in the light path between the projection optical system and the first mirror,
a pupil is formed between the first diffractive element and the second diffractive element,
a second intermediate image of the image light is formed between the first mirror and the second diffractive element,
an exit pupil is formed by the second diffractive element, the first diffractive element and the second diffractive element are in a conjugate relation, and
light emitted from a first position in the first diffractive element enters a range of ±0.8 mm with respect to a second position corresponding to the first position in the second diffractive element.

2. The display device according to claim 1, wherein the first intermediate image is formed between the projection optical system and the first diffractive element.

3. The display device according to claim 1, wherein the first mirror makes light of a field angle in the image light emitted from the first diffractive element enter the second diffractive element as diverging light.

4. The display device according to claim 3, wherein the first mirror makes light diffracted by the first diffractive element to be shifted from light with a specific wavelength enter a predetermined range of the second diffractive element with respect to light corresponding to one point of an image generated by the image light generation device.

5. The display device according to claim 3, wherein the first diffractive element makes the image light emitted from the projection optical system enter the first mirror as converging light.

6. The display device according to claim 3, wherein a plane of incidence of the second diffractive element is a concavely curved surface recessed in a central part from a peripheral part, and
the second diffractive element collimates the image light emitted from the first mirror.

7. The display device according to claim 1, wherein an absolute value of magnifying power of projection on the second diffractive element due to the first diffractive element is in a range from 0.5 times to 10 times.

8. The display device according to claim 7, wherein the absolute value of the magnifying power is in a range from a same size to 5 times.

9. The display device according to claim 1, wherein an optical distance between the first diffractive element and the first mirror is shorter than an optical distance between the first mirror and the second diffractive element.

10. The display device according to claim 1, wherein when the pupil is between the first diffractive element and the mirror, the pupil is nearer to the mirror than to the first diffractive element, and
when the pupil is between the mirror and the second diffractive element, the pupil is nearer to the mirror than to the second diffractive element.

11. The display device according to claim 1, further comprising
a second mirror reflects the image light from the projection optical system toward the first diffractive element.

12. A display device comprising:
an image light generation device;
a projection optical system including a first lens and a second lens;
a first diffractive element;
a first mirror; and
a second diffractive element,
wherein the projection optical system, the first diffractive element, the first mirror and the second diffractive element are disposed along a light path of image light emitted from the image light generation device,
a first intermediate image of the image light is formed in the light path between the first lens located closest to the image light generation device and the first mirror,
a pupil is formed between the first diffractive element and the second diffractive element,
a second intermediate image of the image light is formed between the first mirror and the second diffractive element,
an exit pupil is formed by the second diffractive element, and an optical distance between the first diffractive element and the first mirror is shorter than an optical distance between the first mirror and the second diffractive element.

13. The display device according to claim 12, wherein the first intermediate image is formed in the projection optical system.

14. The display device according to claim 12, wherein when the pupil is between the first diffractive element and the mirror, the pupil is nearer to the mirror than to the first diffractive element, and when the pupil is between the mirror and the second diffractive element, the pupil is nearer to the mirror than to the second diffractive element.

15. The display device according to claim 12, further comprising a second mirror reflects the image light from the projection optical system toward the first diffractive element.

16. A display device comprising:

an image light generation device;

a projection optical system including a first lens and a second lens;

a first diffractive element;

a first mirror; and a second diffractive element, wherein the projection optical system, the first diffractive element, the first mirror and the second diffractive element are disposed along a light path of image light emitted from the image light generation device, a first intermediate image of the image light is formed in the light path between the first lens located closest to the image light generation device and the first mirror, a pupil is formed between the first diffractive element and the second diffractive element, a second intermediate image of the image light is formed between the first mirror and the second diffractive element, an exit pupil is formed by the second diffractive element, the first diffractive element and the second diffractive element are in a conjugate relation, and light emitted from a first position in the first diffractive element enters a range of ±0.8 mm with respect to a second position corresponding to the first position in the second diffractive element.

* * * * *